(12) United States Patent
Sharma et al.

(10) Patent No.: US 12,025,795 B1
(45) Date of Patent: *Jul. 2, 2024

(54) WEDGE COMBINER FOR EYE-TRACKING

(71) Applicant: META PLATFORMS TECHNOLOGIES, LLC, Menlo Park, CA (US)

(72) Inventors: Robin Sharma, Woodinville, WA (US); Andrew John Ouderkirk, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/590,644

(22) Filed: Feb. 1, 2022

Related U.S. Application Data

(63) Continuation of application No. 16/273,092, filed on Feb. 11, 2019, now Pat. No. 11,237,389.

(51) Int. Cl.
*G02B 27/00* (2006.01)
*G02B 6/122* (2006.01)
*G02B 27/01* (2006.01)

(52) U.S. Cl.
CPC ....... *G02B 27/0093* (2013.01); *G02B 6/1228* (2013.01); *G02B 27/0172* (2013.01); *G02B 2027/0138* (2013.01); *G02B 2027/0178* (2013.01)

(58) Field of Classification Search
CPC .............. G02B 27/0093; G02B 6/1228; G02B 27/0172

USPC ......................................................... 359/630
See application file for complete search history.

(56) References Cited

U.S. PATENT DOCUMENTS

| 6,396,461 | B1 * | 5/2002 | Lewis | G06F 3/013 345/7 |
| 8,467,133 | B2 * | 6/2013 | Miller | G06Q 30/02 359/13 |
| 8,472,120 | B2 * | 6/2013 | Border | G02B 27/017 359/13 |
| 8,477,425 | B2 * | 7/2013 | Border | G02B 27/017 359/13 |

(Continued)

OTHER PUBLICATIONS

Non-Final Office Action dated Jun. 2, 2021 for U.S. Appl. No. 16/273,092, filed Feb. 11, 2019, 12 Pages.

(Continued)

*Primary Examiner* — James R Greece
(74) *Attorney, Agent, or Firm* — Morgan, Lewis & Bockius LLP

(57) ABSTRACT

An optical system includes a first optical element having at least a first optical surface and a second optical surface, the first optical surface is not parallel to the second optical surface. The optical system includes a plurality of optical elements positioned adjacent to the second optical surface of the first optical element. The respective optical element of the plurality of optical elements is configured to receive light transmitted through the first optical surface at a first angle with respect to the second optical surface and direct the light back toward the first optical surface at a second angle, that is distinct from the first angle, with respect to the second optical surface.

20 Claims, 17 Drawing Sheets

(56) References Cited

U.S. PATENT DOCUMENTS

| | | | | |
|---|---|---|---|---|
| 8,482,859 | B2* | 7/2013 | Border | G06Q 30/02 |
| | | | | 359/13 |
| 9,239,453 | B2* | 1/2016 | Cheng | G02B 17/086 |
| 9,298,002 | B2* | 3/2016 | Border | G02B 5/30 |
| 9,494,800 | B2* | 11/2016 | Border | G02B 5/30 |
| 9,671,613 | B2* | 6/2017 | Border | G02B 27/144 |
| 9,791,700 | B2* | 10/2017 | Schowengerdt | G06T 5/50 |
| 2008/0117341 | A1* | 5/2008 | McGrew | G02B 26/0808 |
| | | | | 348/766 |
| 2012/0200601 | A1* | 8/2012 | Osterhout | G02B 27/017 |
| | | | | 345/633 |
| 2014/0361957 | A1* | 12/2014 | Hua | G02B 27/0172 |
| | | | | 345/8 |
| 2014/0375789 | A1* | 12/2014 | Lou | G06F 3/013 |
| | | | | 348/78 |
| 2015/0035744 | A1* | 2/2015 | Robbins | G02B 27/0093 |
| | | | | 345/156 |
| 2015/0178939 | A1* | 6/2015 | Bradski | H04N 13/00 |
| | | | | 345/633 |
| 2016/0018650 | A1* | 1/2016 | Haddick | G06F 5/10 |
| | | | | 345/8 |
| 2016/0085300 | A1* | 3/2016 | Robbins | G06F 3/013 |
| | | | | 345/633 |
| 2016/0239985 | A1* | 8/2016 | Haddick | G02B 27/0179 |
| 2018/0003862 | A1* | 1/2018 | Benitez | H04N 13/341 |
| 2018/0373115 | A1* | 12/2018 | Brown | G02B 27/0172 |

OTHER PUBLICATIONS

Restriction Requirement dated Mar. 8, 2021 for U.S. Appl. No. 16/273,092, filed Feb. 11, 2019, 6 Pages.

* cited by examiner

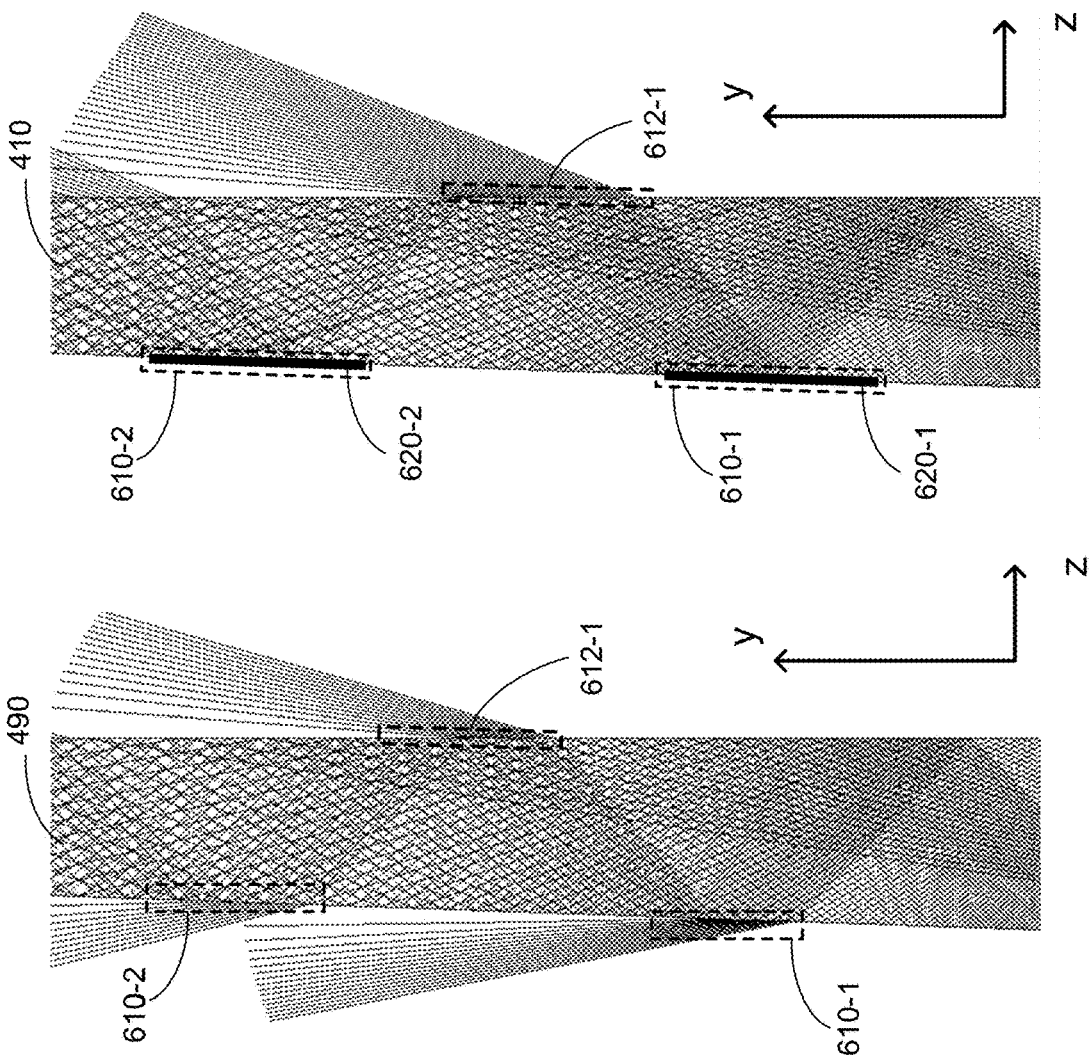
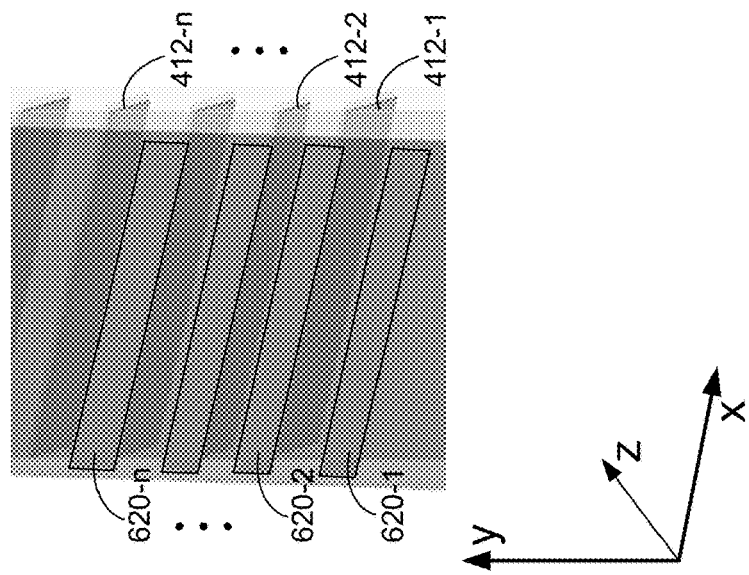
Figure 6A  Figure 6B  Figure 6C

WEDGE COMBINER FOR EYE-TRACKING

RELATED APPLICATIONS

This application is a continuation application of U.S. patent application Ser. No. 16/273,092, filed Feb. 11, 2019, which is incorporated by reference herein in its entirety.

TECHNICAL FIELD

This relates generally to display devices, and more specifically to head-mounted display devices.

BACKGROUND

Head-mounted display devices (also called herein head-mounted displays) are gaining popularity as means for providing visual information to a user. For example, the head-mounted display devices are used for virtual reality and augmented reality operations. Eye tracking allows the head-mounted display devices to determine a user's gaze and provide visual information based on the user's gaze direction.

However, the size and the weight of eye-tracking devices have limited application of eye-tracking devices.

SUMMARY

Accordingly, there is a need for an eye-tracking system in a head-mounted display device that is compact and light. In addition, improved speed and accuracy of eye-tracking devices can further increase the utility of eye-tracking devices.

The optical systems and methods disclosed in this description use waveguides (e.g., a waveguide having the shape of a wedge) and a plurality of optical elements to channel light from one or more portions of an object (e.g., an eye) onto a detector. The combination of the waveguide and the plurality of optical elements allows a camera to capture an on-axis image of the eye (e.g., the camera captures a view of the eye that is "straight on") without being placed directly in front of the eye, thereby avoiding challenges associated with placing the camera directly in front of the eye, such as an occlusion of the view with the camera and the increased size and a shifted weight balance of head-mounted display devices.

In some embodiments, the waveguides and the plurality of optical elements are wavelength-specific, and thus, allow transmission of visible light so that the eye-tracking system can be used for augmented reality operations.

The above deficiencies and other problems associated with conventional head-mounted displays are reduced or eliminated by the disclosed display devices.

In accordance with some embodiments, an optical system includes a first optical element having at least a first optical surface and a second optical surface. The first optical surface is not parallel to the second optical surface. The optical system includes a plurality of optical elements positioned adjacent to the second optical surface of the first optical element. A respective optical element of the plurality of optical elements is selected from a group consisting of a reflector and a diffraction element, and the respective optical element of the plurality of optical elements is configured to: receive light transmitted through the first optical surface at a first angle with respect to the second optical surface and direct the light back toward the first optical surface at a second angle, that is distinct from the first angle, with respect to the second optical surface; and/or receive light guided through the first optical element at a third angle with respect to the second optical surface and direct the light toward the first optical surface at a fourth angle, that is distinct from the third angle, with respect to the second optical surface.

In accordance with some embodiments, a method of eye-tracking includes receiving, at a first optical element having at least a first optical surface and a second optical surface, rays from one or more portions of an eye. The first optical surface is not parallel to the second optical surface. The method includes receiving, at a respective optical element of a plurality of optical elements positioned adjacent to the second optical surface of the first optical element, rays transmitted through the first optical surface at a first angle with respect to the second optical surface and direct the rays back toward the first optical surface at a second angle, that is distinct from the first angle, with respect to the second optical surface. The method includes forming an image of the eye using rays that exit through a third optical surface of the first optical element; and determining a position of the eye based on the image.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 6A shows rays exiting from two surfaces of an optical element in accordance with some embodiments.

FIG. 6B shows rays exiting from an optical element with reflective elements in accordance with some embodiments.

FIG. 6C shows a perspective view of an optical element in accordance with some embodiments.

These figures are not drawn to scale unless indicated otherwise.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first optical element could be termed a second optical element, and, similarly, a second optical element could be termed a first optical element, without departing from the scope of the various described embodiments. The first optical element and the second optical element are both optical elements, but they are not the same optical element.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 1:
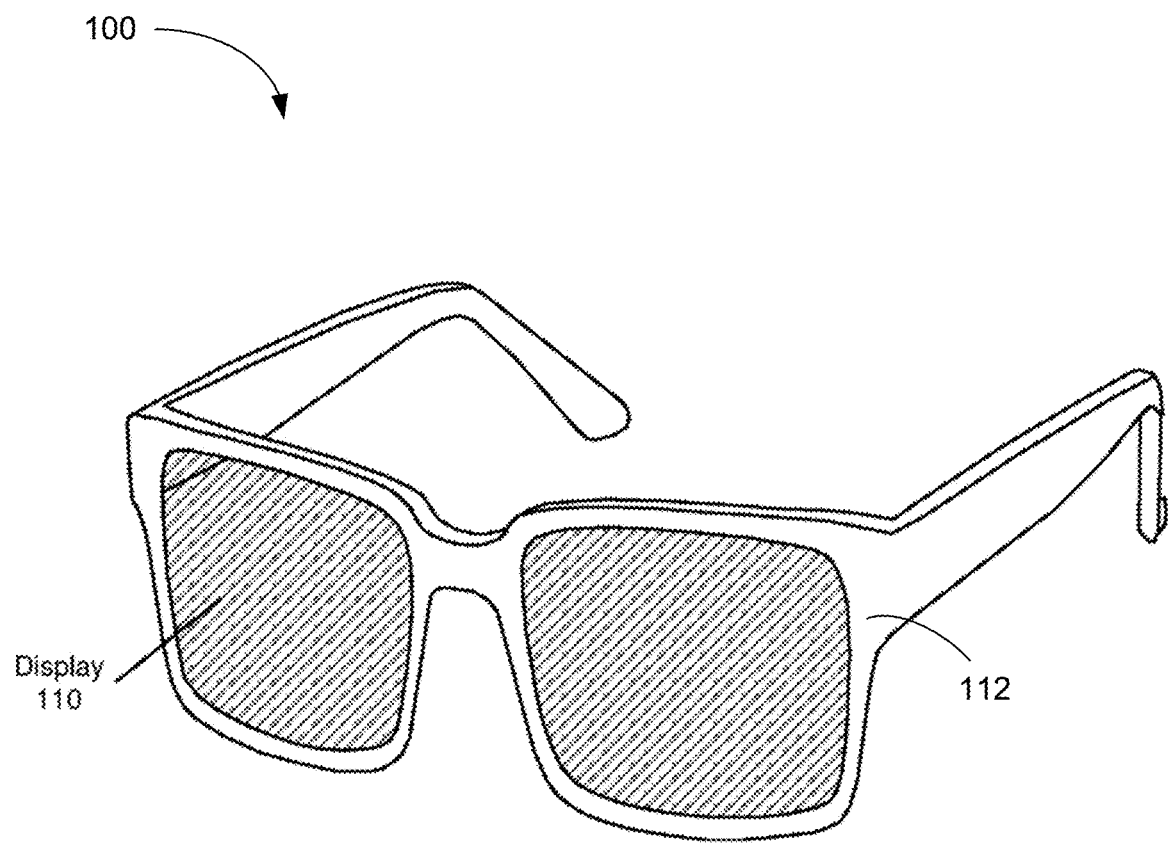
FIG. 1 is a perspective view of a display device in accordance with some embodiments.

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
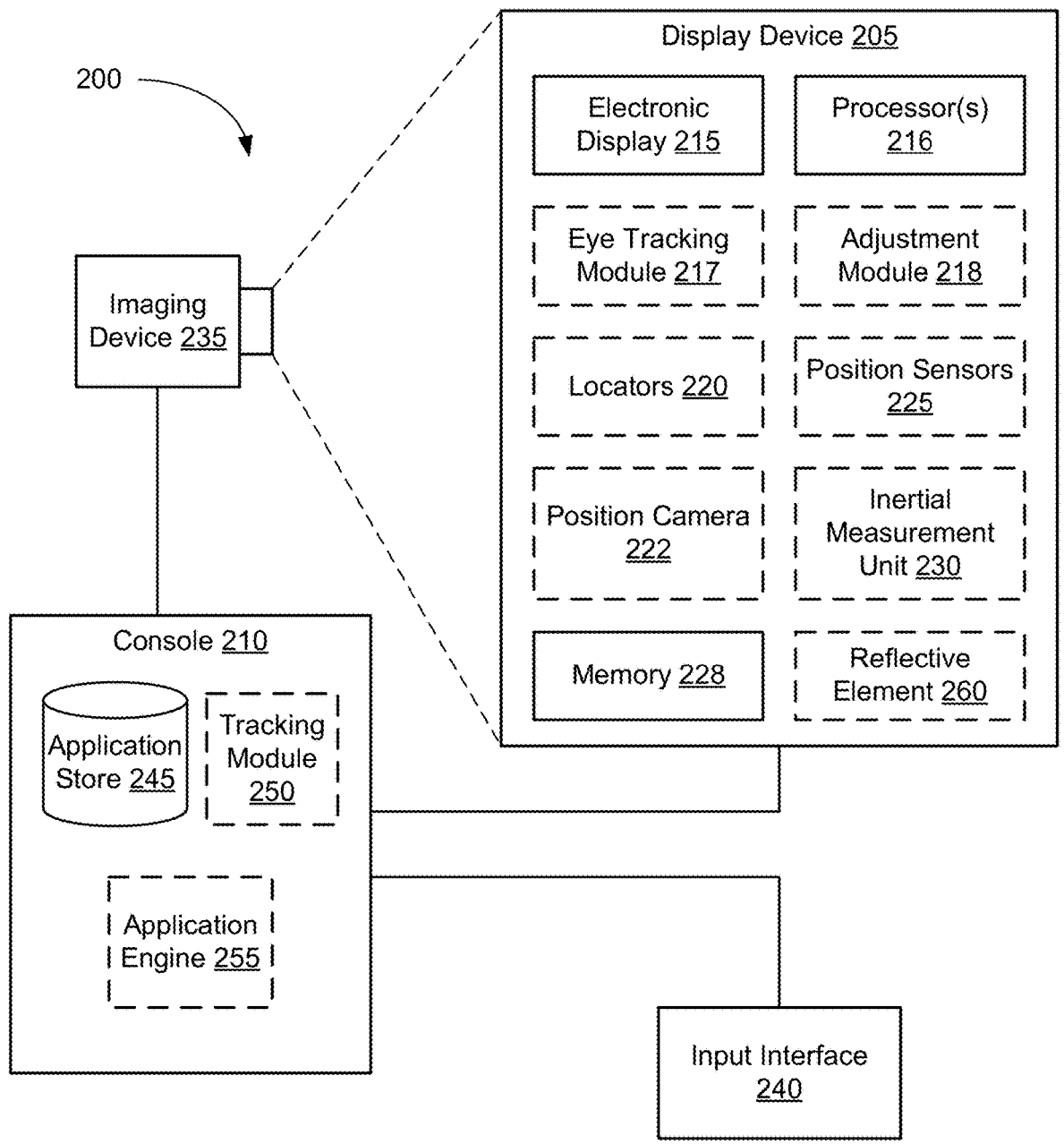
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and mixed reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more reflective elements 260 or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to display images to the user by projecting the images onto one or more reflective elements 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array. In some embodiments, electronic display 215 projects images to one or more reflective elements 260, which reflect at least a portion of the light toward an eye of a user.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light toward the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 optionally includes one or more reflective elements 260. In some embodiments, electronic display device 205 optionally includes a single reflective element 260 or multiple reflective elements 260 (e.g., a reflective element 260 for each eye of a user). In some embodiments, electronic display device 215 projects computer-generated images on one or more reflective elements 260, which, in turn, reflect the images toward an eye or eyes of a user. The computer-generated images include still images, animated images, and/or a combination thereof. The computer-generated images include objects that appear to be two-dimensional and/or three-dimensional objects. In some embodiments, one or more reflective elements 260 are partially transparent (e.g., the one or more reflective elements 260 have a transmittance of at least 15%, 20%, 25%, 30%, 35%, 40%, 45%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3:
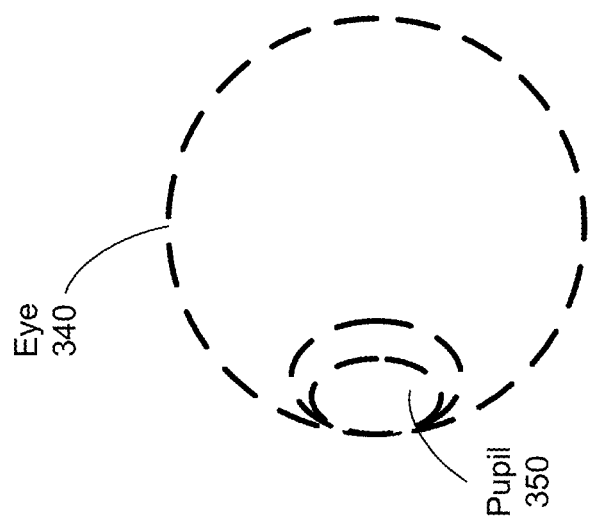
FIG. 3 is an isometric view of a display device in accordance with some embodiments.
Figure 3:
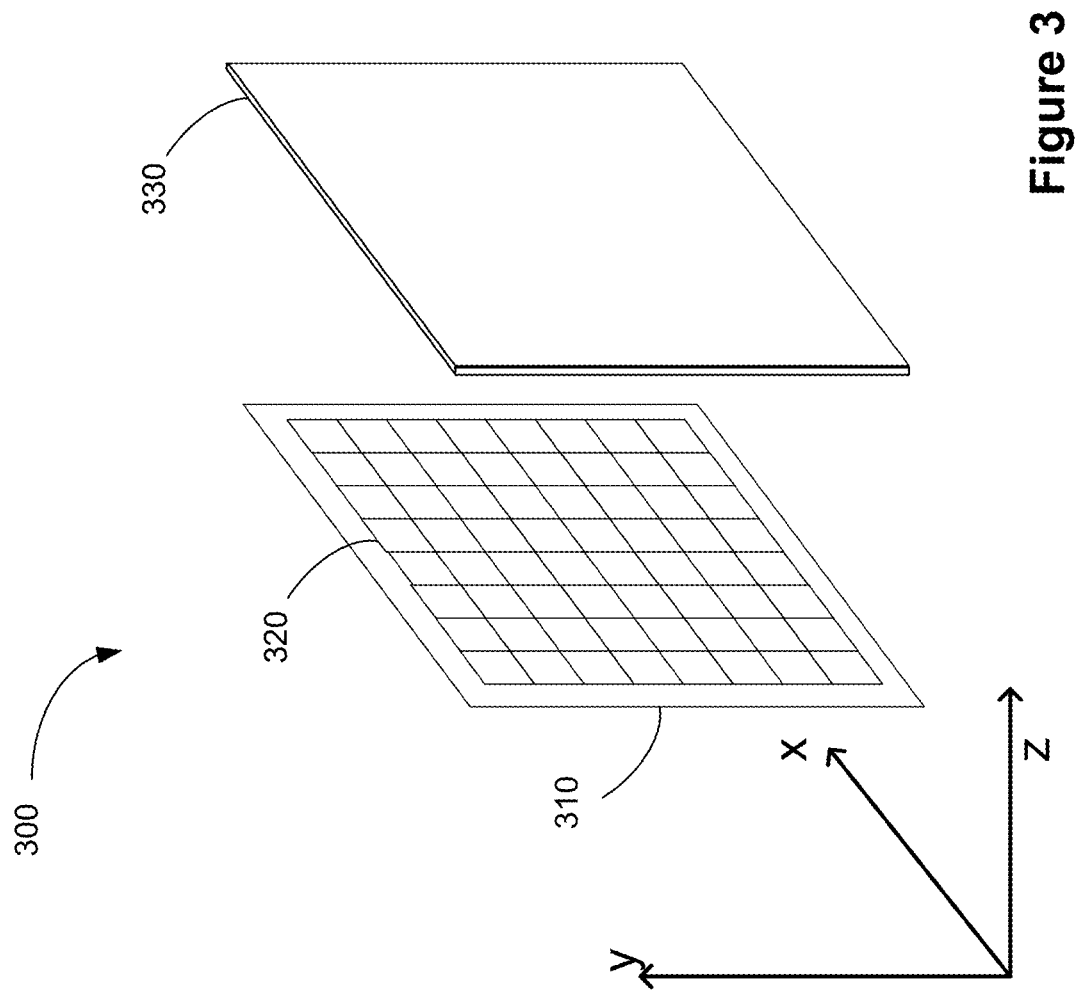

FIG. 3 is an isometric view of display device 300 in accordance with some embodiments. In some other embodiments, display device 300 is part of some other electronic display (e.g., a digital microscope, a head-mounted display device, etc.). In some embodiments, display device 300 includes light emission device array 310 and one or more lenses 330. In some embodiments, display device 300 also includes an IR detector array.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR).

In some embodiments, display device 300 includes an emission intensity array configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to control what portion of the image light emitted from light emission device array 310 is passed to the one or more lenses 330. In some embodiments, display device 300 uses an emission intensity array to facilitate providing image light to a location of pupil 350 of eye 340 of a user, and minimize the amount of image light provided to other areas in the eyebox.

One or more lenses 330 receive the modified image light (e.g., attenuated light) from emission intensity array (or directly from emission device array 310), and direct the modified image light to a location of pupil 350.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and an emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses 330 toward the determined location of pupil 350, and not toward other locations in the eyebox.

In some embodiments, display device 300 includes one or more broadband sources (e.g., one or more white LEDs) coupled with a plurality of color filters, in addition to, or instead of, light emission device array 310.

Figure 4A:
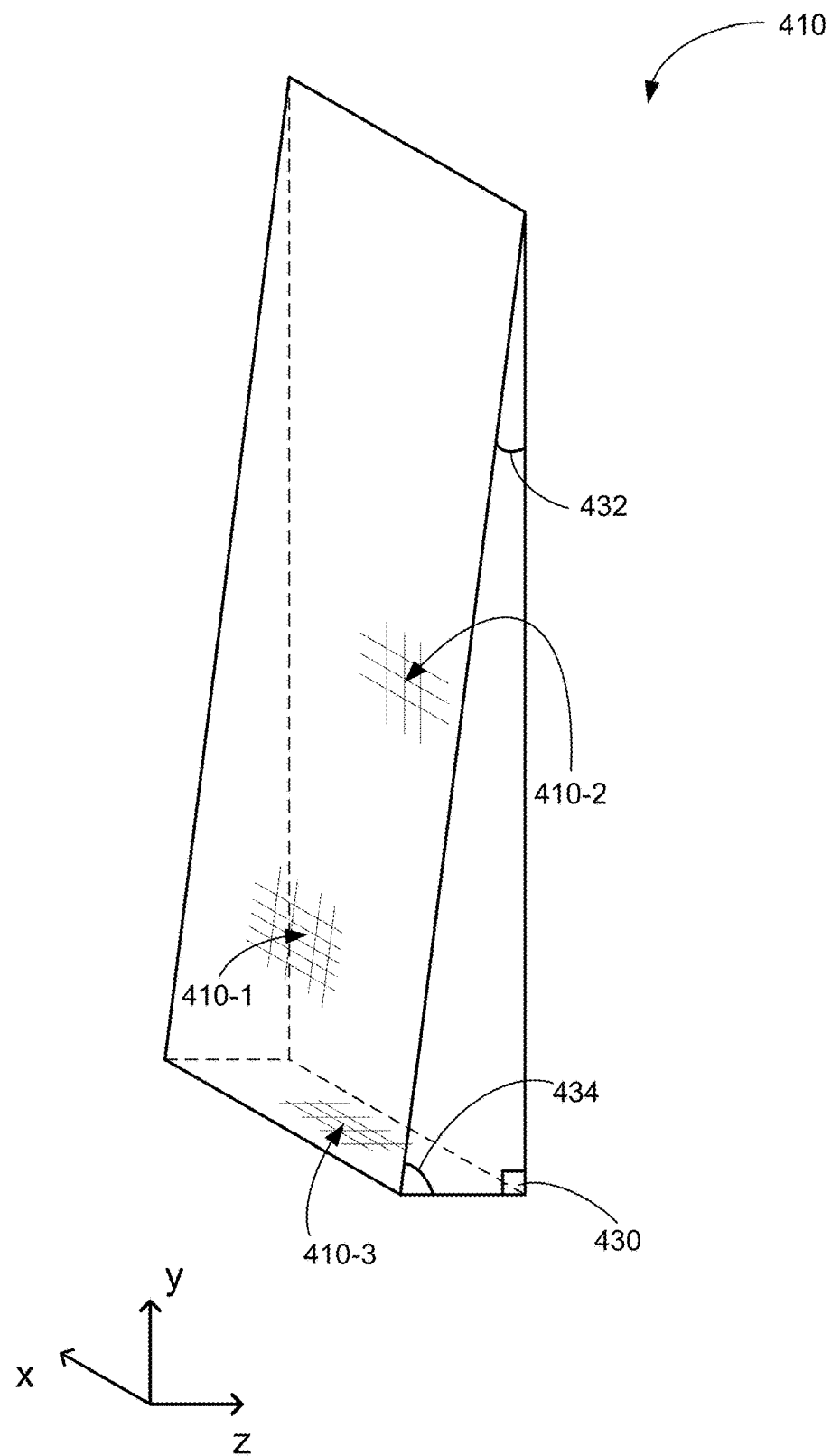
FIG. 4A shows a perspective view of an optical element in accordance with some embodiments.

FIG. 4A shows a perspective view of the wedge 410 (also called herein a wedge waveguide). The wedge 410 has a first optical surface 410-1 and a second optical surface 410-2, which is not parallel with the first optical surface 410-1. In some embodiments, the first optical surface 410-1 intersects a third optical third optical surface 410-3 at a first acute angle 434. In some embodiments, the first optical surface 410-1 and the third optical surface 410-3 form the first acute angle 434 but the first optical surface 410-1 does not directly intersect with the third optical surface 410-3 (e.g., by removing a corner of the wedge 410 that corresponds to the first acute angle 434). In some embodiments, the third optical surface 410-3 is perpendicular to the second optical surface 410-2 (e.g., an angle 430 formed by the second optical surface 410-2 and the third optical surface 410-3 is a right angle). In some embodiments, the first optical surface 410-1 intersects the second optical surface 410-2 at a second acute angle 432. In some embodiments, the first acute angle is the same as the second acute angle 432 (e.g., 45°). In some embodiments, the first optical surface 410-1 and the second optical surface 410-2 form the second acute angle 432 but the first optical surface 410-1 does not directly intersect with and the second optical surface 410-2 (e.g., by removing a corner of the wedge 410 that corresponds to the second acute angle 432). In some embodiments, the first acute angle 434 is different from the second acute angle 432. That the three surfaces of the wedge 410 are optical surfaces (e.g., surfaces having a sufficiently small surface roughness to not distort light having wavelengths of 400 nm-800 nm that transmit through the surfaces, such as having a surface flatness less than $\lambda/2$, less than $\lambda/4$, or less than $\lambda/20$ and having a surface roughness that corresponds to scratch-dig values of 80-50, or 60-40, or 20-10) allows wedge 410 to be used in augmented reality (AR) applications.

Although certain figures of this application (e.g., FIGS. 4B-4E, 5A-5B, 6A-6B, 6D-6E, 7A-7E, 8 and 9) show only cross-sectional views of optical elements (e.g., wedges 410 and 490) or optical systems so as not to obscure certain aspects of such optical elements or optical systems, a person having ordinary skill in the art would understand that such optical elements or optical systems extend in the x-direction (e.g., in a direction perpendicular to the plane of the drawing) like the wedge 410 shown in FIG. 4A.

Figure 4B:
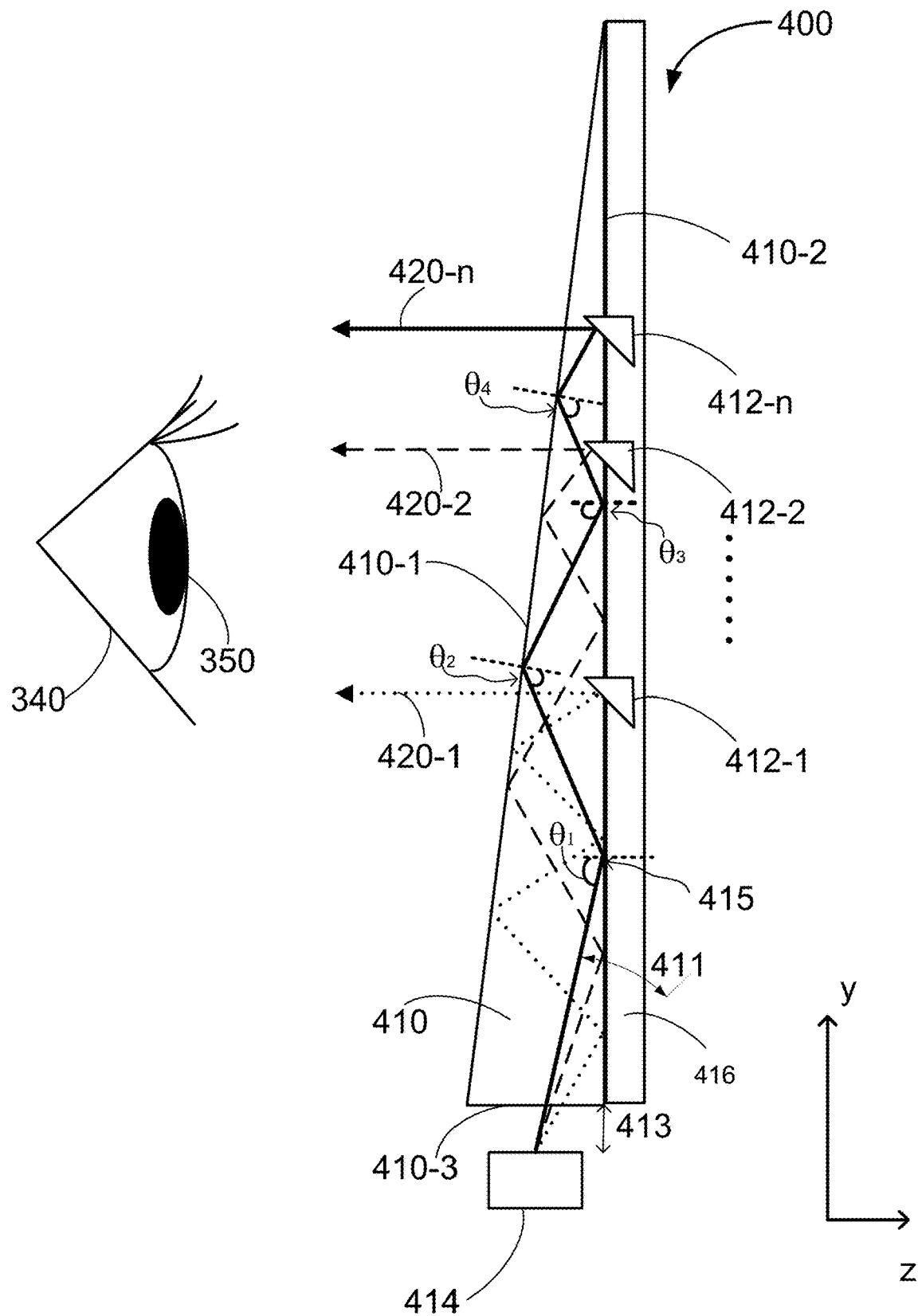
FIG. 4B shows a cross-sectional view of an optical system in accordance with some embodiments.

FIG. 4B shows an example optical system 400 in accordance with some embodiments. The optical system 400 includes a first optical element having a shape of the wedge 410.

In some embodiments, the optical system 400 includes a light source 414. In some embodiments, the light source 414 is a point source that emits rays of radiation within a range 411 of angles. In some embodiments, the radiation has near-infrared (NIR) wavelengths (e.g., greater than 800 nm, greater than 1 μm, greater than 1.5 μm, greater than 2 μm, etc.). Although FIG. 4B shows a gap 413 between the light source 414 and the wedge 410, in some embodiments, there is no gap (e.g., the source is in direct contact with the wedge 410, and radiation emitted from the source 414 does not experience refraction at an air-material (of the wedge 410) interface at the third optical surface 410-3. For simplicity, FIG. 4B does not show refraction at the third optical surface 410. In general, rays emitted from the source 414 that impinge on the third optical surface 410-3 at an incidence angle greater than 0° (with respect to a normal of the third optical surface 410-3) experience refraction.

A ray 420-$n$, emitted from the light source 414, is transmitted through the third optical surface 410-3 and impinges at a first location 415 on the second optical surface 410-2 of the wedge 410 at a first incidence angle $\theta_1$ (as measured from a surface normal of the second optical surface 410-2 at the first location 415). When $\theta_1$ is equal to or greater than a critical angle, $\theta_c$, of the material that forms the wedge 410, ray 410-$n$ would undergo total internal reflection (TIR) at the first location. At a material-air interface, $\theta_c$ of the material is the inverse sine of the ratio of the refractive index of air $n_{air}$ over the refractive index n of the material (i.e., $\theta_c = \sin^{-1}(n_{air}/n)$). In some embodiments, the wedge 410 has a varying refractive index. In such embodiments, $\theta_c$ varies within the wedge 410, according to the refractive index at a particular location of the air-material interface.

For the ray 420-$n$ illustrated in FIG. 4B, the ray 420-$n$ reflects off the second optical surface 410-2 (by total internal reflection) at an angle having the same magnitude as $\theta_1$ relative to a surface normal of the second optical surface 410-2. An angle, as used throughout this description, has both a magnitude and a sign (e.g., positive (+), negative (−), to denote directionality. The incidence angle $\theta_1$ of the ray 420-$n$ at the first location 415 on the second optical surface 410-2 and its reflection angle at the first location 415 have the same magnitude but different signs.

Because the first optical surface 410-1 of the wedge 410 is not parallel to the second optical surface 410-2 of the wedge 410, after reflecting off the first location 415 on the second optical surface 410-2, the ray 420-$n$ impinges on the first optical surface 420-1 at an incidence angle $\theta_2$, that has a different (e.g., smaller) magnitude from $\theta_1$. If the first optical surface 410-1 were parallel to the second optical surface 410-2, then the magnitude of $\theta_1$ would be equal to the magnitude of $\theta_2$. When $\theta_2$, which is smaller than $\theta_1$, meets the total internal reflection condition (e.g., $\theta_2 \geq \theta_c$), the ray 420-$n$ is reflected off the first optical surface 410-1 at a reflection angle having the same magnitude as $\theta_2$.

Similarly, each ray continues to be reflected by the first optical surface 410-1 and the second optical surface 410-2 while a respective incident angle satisfies the total internal reflection condition (e.g., the ray continues to be guided within the wedge 410 along the y-direction).

When an incidence angle of a ray on a surface is smaller than $\theta_c$, the ray is no longer reflected by total internal reflection, but is at least partially refracted (as opposed to reflected) and transmitted through that surface. For example, FIG. 4C shows a wedge 490 and rays that do not meet the total internal reflection condition (e.g., their angle of incidence at a first optical surface 490-1 is smaller than $\theta_c$) are refracted at, and transmitted through, the first optical surface 490-1 and the second optical surface 490-2.

Figure 4D:
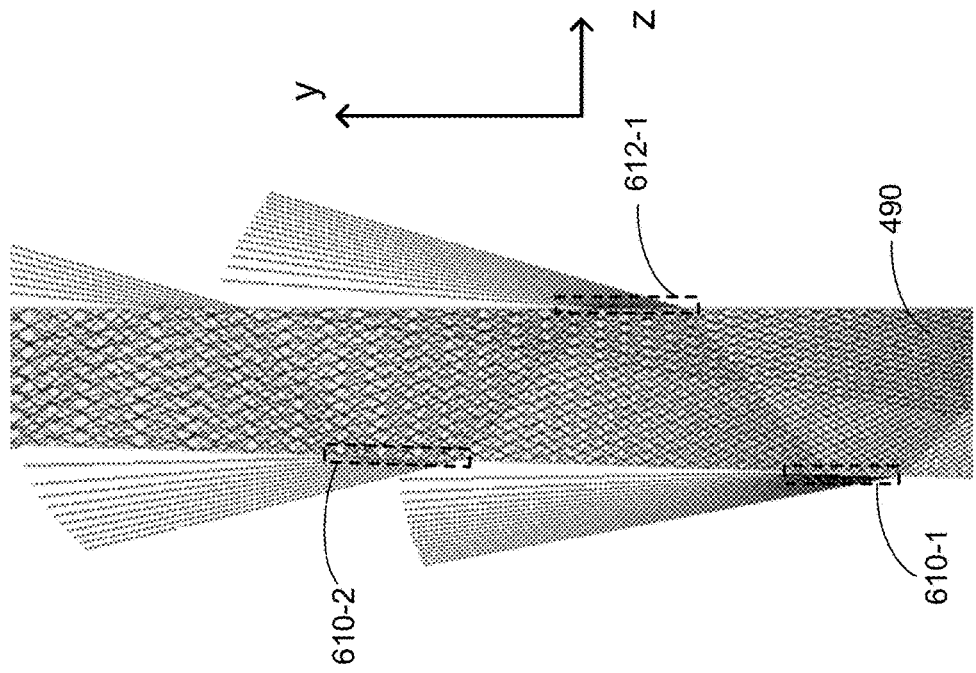
FIG. 4D shows an enlarged view of the optical element of FIG. 4C.
Figure 4C:
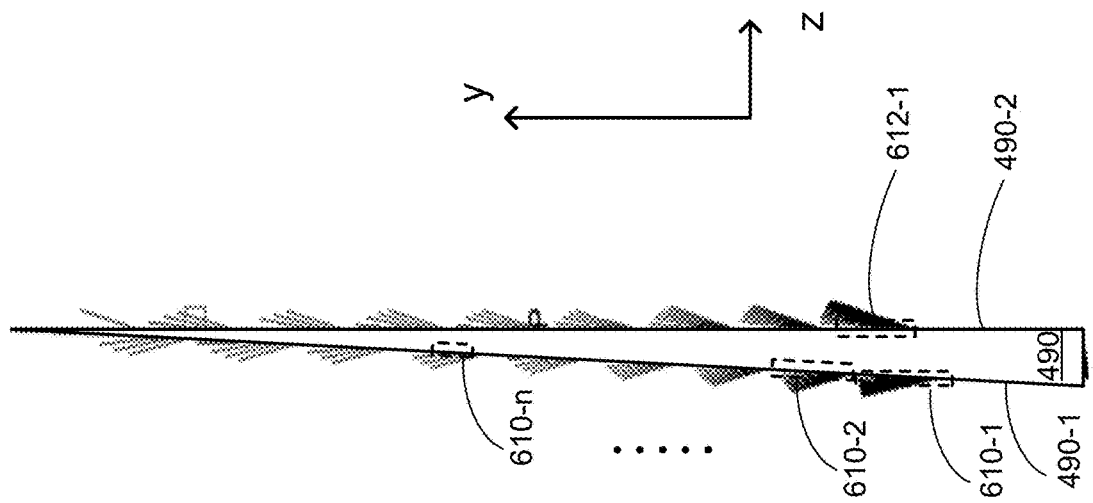
FIG. 4C shows a cross-sectional view of an optical element in accordance with some embodiments.

An enlarged view of a portion of the wedge 490, including a first region 610-1 is shown in FIG. 4D. The first region 610-1 is spatially separated, on the first optical surface 490-1, from a second region 610-2. At every location that a bundle of rays reflects at the first optical surface 490-1, rays within that bundle that do not meet the total internal reflection condition (e.g., rays having incidence angles that are smaller than $\theta_c$) at that location "leak out" (e.g., transmitted through the optical surface, optionally with refraction if the incidence angle is not 0°). For example, when the bundle of rays reflects n times at n locations along the first optical surface, there are n possible regions (e.g., 610-1, 610-2, 610-$n$) on the first optical surface where rays from the bundle leak out because the total internal reflection condition is not met for at least a subset of the rays from the bundle at a particular region. Similarly, when the bundle of rays reflects off a second optical surface 490-2, rays within that bundle that do not meet the total internal reflection condition escape from the wedge 490, and are no longer guided within the wedge 490. As described above, because the first optical surface 490-1 is not parallel to the second optical surface 490-2, the incidence angle of a ray (at a respective reflection location) changes as the ray is guided up along the y-axis by repeated total internal reflection off the two optical surfaces. In some embodiments, the incidence angle of the ray decreases (because of the inclined second optical surface 490-2, as described above with respect to FIG. 4B) at each reflection location as the ray is guided up further along the y-axis. For example, rays that leak from a region 612-1 on the second optical surface 490-2 meet the total internal reflection condition at the first region 610-1, but no longer meets the total internal reflection condition at the region 612-1, because the incidence angle has decreased. Similarly, rays that leak at the second region 610-2 have met the total internal reflection condition at the first location 610-1 and the region 612-1, but no longer meet the condition after propagating to the second location 610-2.

Figure 4E:
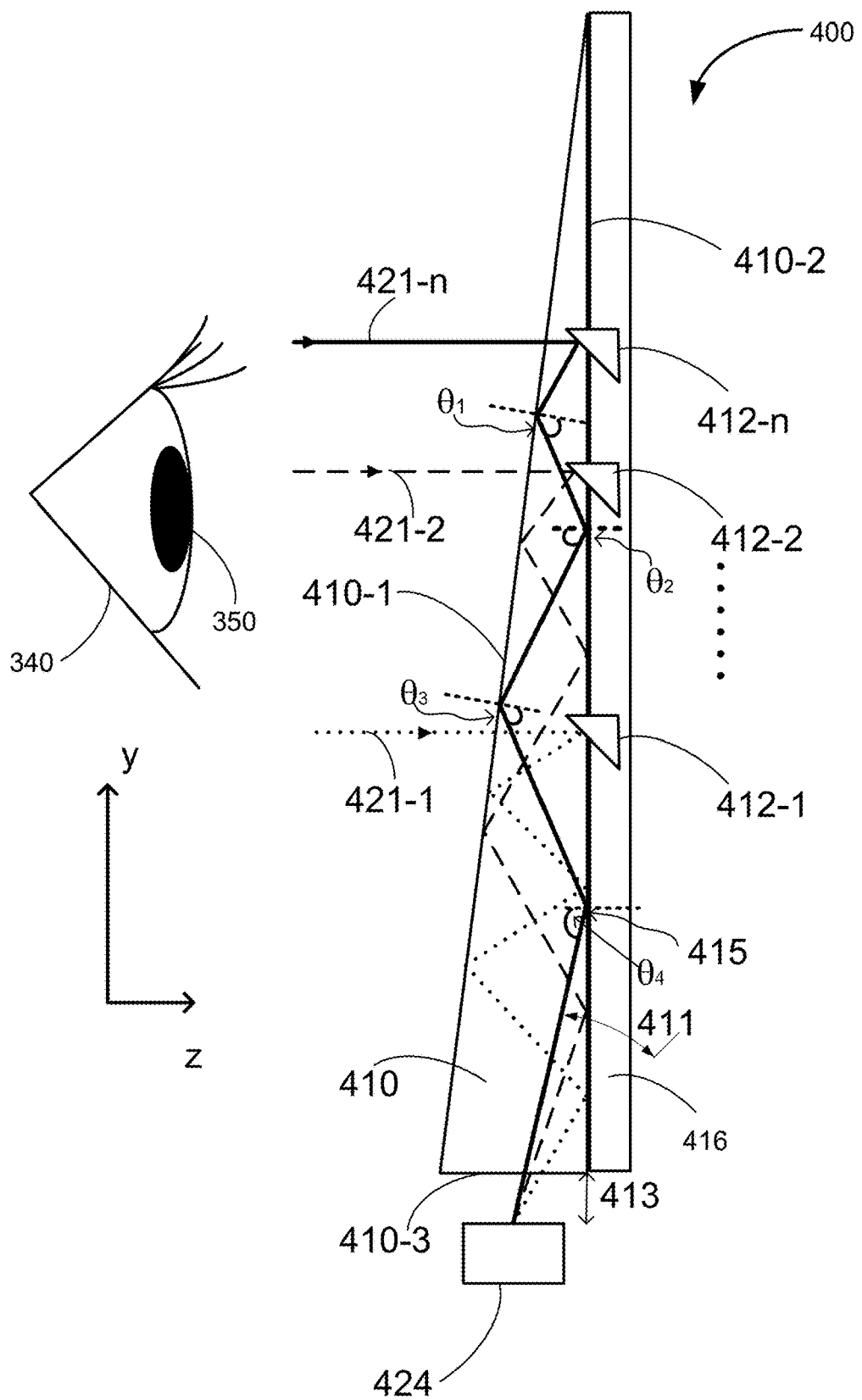
FIG. 4E shows a cross-sectional view of an optical system in accordance with some embodiments.

Reversing the direction of rays depicted in FIG. 4B, FIG. 4E shows rays 420-1, 420-2, and 420-n from an object (e.g., light reflected off an eye 340). As a ray 421-n enters the wedge 410 through the first optical surface 410-1 and propagates toward the third optical surface 410-3 (in the negative y-direction), the incidence angle of the ray 421-n at every reflection (e.g., each reflection on either the first optical surface 410-1 or the second optical surface 410-2) increases (e.g., $\theta_1 < \theta_2 < \theta_3 < \theta_4$) because the first optical surface 410-1 is not parallel to the second optical surface 410-2 (and in particular, the ray 421-n travels from a region within the wedge 410 with a narrow width to a region within the wedge 410 with a wider width. For example, the width is a shortest distance along the z-axis between a point at a y-position on the first optical surface 410-1, and a point at the same y-position on the second optical surface 410-2. When the rays entering the wedge 410 through the first optical surface 410-1 meet the total internal reflection condition at the second optical surface 410-2, subsequent reflections satisfy the total internal reflection condition and the rays are guided within the wedge 410 toward the third optical surface 410-3. Those rays continue to meet the total internal reflection condition because the incidence angles of the rays increase as the rays propagate toward the third optical surface (in the negative y-direction). If a ray has an angle of incidence, at a higher y position, that is large enough to meet the total internal reflection condition, an increased angle of incidence of the ray at a lower y position also meets the total internal reflection condition.

In some embodiments, a camera 424, placed adjacent to the third optical surface 410-3, captures the rays exiting the wedge 410 through the third optical surface 410-3 to provide information that represents an image of the eye 340. The image of the eye can be used to track the eye. Tracking the eye is useful for head-mounted display devices, in particular when used for virtual reality, augmented reality or mixed reality applications. One way of tracking the eye is to track the position and/or shape of a pupil 350 of the eye 340. Positions of glints that reflect off the cornea-air interface can also be used for eye-tracking.

In some embodiments, the optical system 400 is part of a head-mounted display having a form of eyeglasses (e.g., the wedge 410 is placed in front of an eye in addition to, or in place of, a lens of the eyeglasses), and the camera 424 is placed within the frame (as opposed to temple arms) of the head-mounted display. The view of the camera in such embodiments is less likely to be obstructed by hair or other facial features of the wearer. In such embodiments, because the camera is part of the rim of the frame, eye-tracking is not affected even if there are mechanical damages to the temple arm of the glasses.

In some embodiments, additional optical elements placed along the line of sight of the user within the user's field of view allows in-field imaging. In some embodiments, in-field imaging uses components that have sufficient see-through quality. In some embodiments, the light sources (for imaging the eye) in the field of view of the user do not affect the see-through quality of the user's surroundings ("world") and the display shown by the head-mounted display. A low power consumption, a high efficiency of elements, and high robustness (e.g., mechanical, electrical) in in-field imaging are preferred. The light sources used for imaging the eye should also meet light safety standards to reduce (e.g., eliminate) the risk of bodily harm to the user.

The optical system 400, including the wedge 410, channels rays from the eye 340 to the camera, allowing the eye to be imaged "in-field". In some embodiments, because the wedge 410 is a passive optical element, the optical system 400 does not use electrical power for operation of the wedge 410. In some embodiments, by spreading rays from a point light source along the y-direction, an object can be illuminated (and subsequently imaged) over the height (y-dimension) of the object.

In-field configurations shown in FIG. 4E place the viewpoint of the camera (also known as camera perspective) almost on-axis with the eye (e.g., the camera captures a view of the eye that is "straight on"). In contrast, "out-of-field" imaging involves a camera placed along a boundary of a viewing optic such that it captures a view of the eye that is tangential or off-axis.

In some embodiments, the wavelength range of rays 420-1 to 420-n and 421-1 to 421-n is in the NIR. The wavelength range of NIR light can be detected by a suitable NIR sensor such as a complementary metal-oxide-semiconductor (CMOS) or a charge-coupled device (CCD) sensor. In some embodiments, the wavelength ranges are between 830 nm-860 nm, and between 930-980 nm.

In some embodiments, the rays 420-1 to 420-n (e.g., FIG. 4B), and the rays 421-1 to 421-n (e.g., FIG. 4E) have a wavelength between 750 nm to 2500 nm. In some embodiments, the wedge 410 and the plurality of optical elements are transmissive (e.g., has a transmittance of 90% or greater) to radiation having a wavelength between 400 nm to 750 nm. In some embodiments, the wedge 410 is transmissive to radiation having a wavelength between 400 nm to 2500 nm.

Figure 5A:
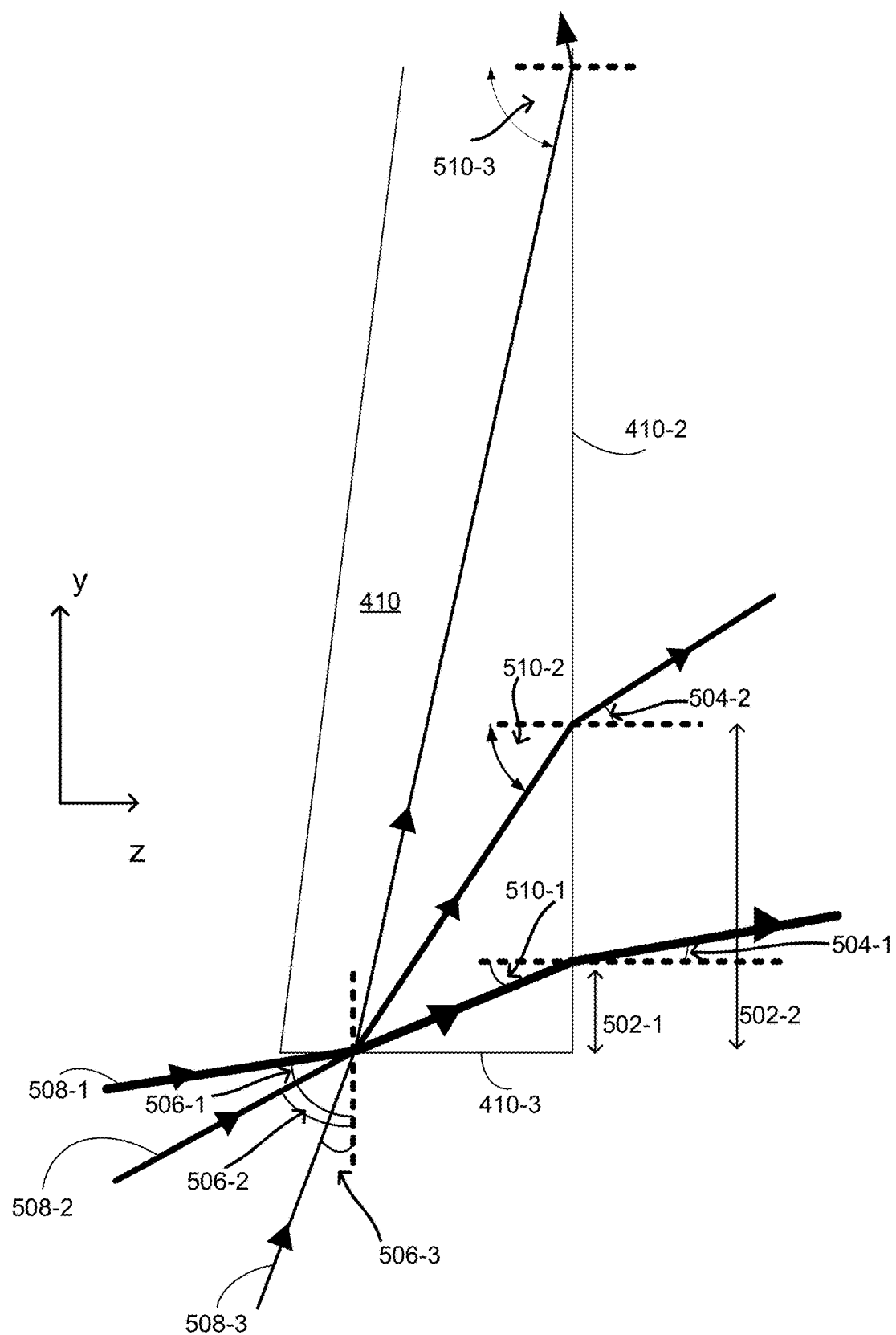
FIG. 5A shows trajectories of rays in an optical element in accordance with some embodiments.

FIG. 5A shows the trajectories of different rays (shown by different line thicknesses) entering the wedge 410 at different angles through the third optical surface 410-3.

A ray 508-1 enters the wedge 410 at the largest input angle 506-1 (as measured from a surface normal, shown in dotted lines, of the third optical surface 410-3), among the three rays shown in FIG. 5A (i.e., rays 508-1, 508-2, and 508-3). The ray 508-1 is refracted upon entering the wedge 410, and is bent closer to the surface normal. It is then incident on the second optical surface 410-2 of the wedge at an incident angle 510-1. Because the incident angle 510-1 is less than the critical angle of the material that forms the wedge 410, the ray 508-1 is not entirely reflected, but is refracted at least partially and the refracted light exits the wedge 410 through the second optical surface 410-2, at an out-coupling height of 502-1, and at an output angle of 504-1.

A ray 508-2 enters the wedge 410 at a smaller input angle 506-2 than the ray 508-1 (as measured from a surface normal, shown in dotted lines, of the third optical surface 410-3). The ray 508-2 is refracted upon entering the wedge 410, and is bent toward the surface normal of the third optical surface 410-3. It is then incident on the second optical surface 410-2 of the wedge at an incident angle 510-2. The ray 508-2 travels up further along the y-axis compared to the ray 508-1 because the ray 508-2 travels at a steeper angle after refraction at the third optical surface 410-3. The incident angle 510-2 is larger than the incident angle 510-1, but it is less than the critical angle of the material that forms the wedge 410. As a result, the ray 508-2 is not entirely reflected, but is refracted at least partially and the refracted light exits the wedge 410 through the second optical surface 410-2, at an out-coupling height of 502-2, and at an output angle of 504-2.

A ray 508-3 enters the wedge 410 at the smallest incident angle of the three rays (as measured from a surface normal, shown in dotted lines, of the third optical surface 410-3). The ray 508-3 is refracted upon entering the wedge 410, and is bent toward the surface normal of the third optical surface 410-3. It is then incident on the second optical surface 410-2 of the wedge at an incident angle 510-3. The ray 508-3 travels up furthest along the y-axis compared to the other rays because it travels at the steepest angle after refraction at the third optical surface 410-3. The incident angle 510-3 is now equal to or greater than the critical angle of the material that forms the wedge 410. As a result, the ray 508-3 is reflected by total internal reflection.

As explained above, rays with incident angles less than the critical angle (e.g., rays 510-1 and 510-2) at least partially exit the wedge 410 through the second optical surface 410-2 and rays with incident angles greater than the critical angle (e.g., ray 510-3) are reflected by total internal reflection. As a result, as shown in FIGS. 4C and 4D, the exiting rays are clustered together in discrete regions.

Although FIG. 5A illustrates the trajectories of rays entering the wedge 410 at different angles through the third optical surface 410-3 and propagating toward the second optical surface 410-2, in some embodiments, rays are directed in such a manner that, subsequent to entering the wedge 410 through the third optical surface 410-3, the rays propagate toward the first optical surface 410-1 first instead of the second optical surface 410-2.

Figure 5D:
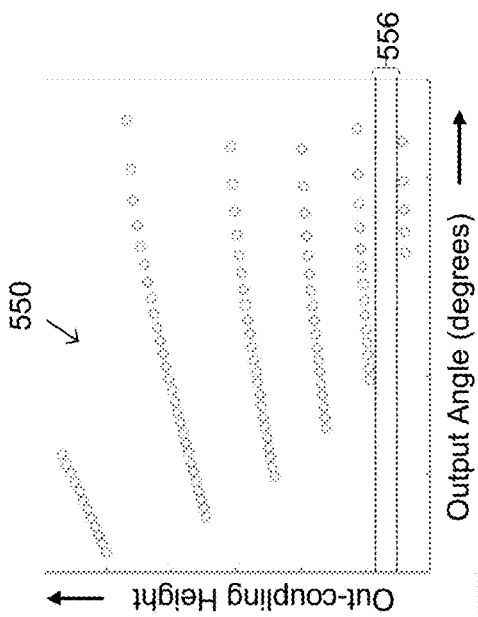
FIG. 5D shows a relationship between out-coupling heights as a function of output angles of rays in accordance with some embodiments.
Figure 5C:
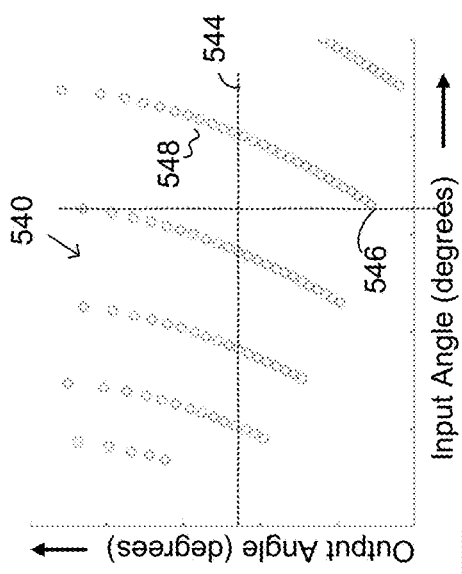
FIG. 5C shows a relationship between output angles as a function of input angles of rays in accordance with some embodiments.
Figure 5B:
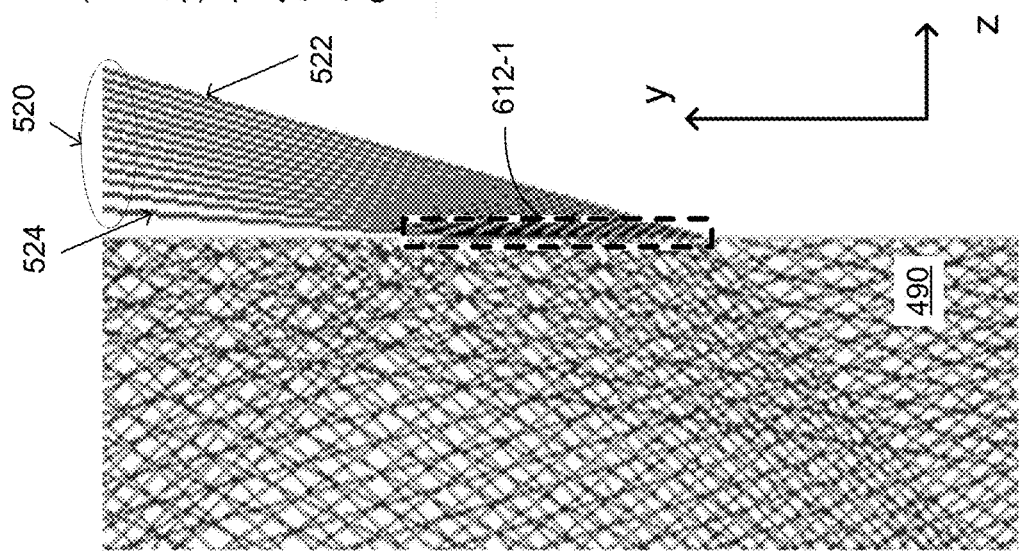
FIG. 5B shows trajectories of rays exiting an optical element in accordance with some embodiments.

FIG. 5B shows an enlarged view of a portion of the wedge 490 surrounding the region 612-1 shown in FIG. 4D. A bundle 520 of output rays exits the region 612-1. The bundle 520 includes a ray 522 that has the smallest output angle among the rays in the bundle 520, and a ray 524 that has the largest output angle among the rays in the bundle 520. The ray 522 also has a lower out-coupling height compared to the ray 524.

This is consistent with a plot 550 in FIG. 5D showing the out-coupling height as a function of output angles. FIG. 5D shows that, within a bundle of rays (e.g., the bundle 520 in FIG. 5B) in a particular region (e.g., 612-1), the out-coupling heights increase with increasing output angles (e.g., the ray 524 has a larger output angle and a higher out-coupling height than the ray 522). The rays are also out-coupled at discrete locations. For example, each of regions 612-1 and 612-2, shown in FIG. 4D, has its own bundle of output rays. In some embodiments, there are n locations (e.g., n=5, n=10, n>20, etc.) along the second optical surface 410-2 of the wedge where rays are out-coupled.

The ranges of angles in the plot 550 in FIG. 5D of the out-coupled rays at different locations (e.g., different out-coupling height) differ. In some embodiments, the ranges of angle overlap for a portion of the range. FIG. 6D shows that the regions (e.g., 612-1 and 612-2) are discrete to one another, and spatially separated along the second optical surface 410-2. Similarly, FIG. 5D shows a range 556 of heights in which no rays are out-coupled.

The angle and the height at which a ray leaks out (e.g., the output angle and the out-coupling height, respectively) are related to the geometry of the system (e.g., wedge 410, system 400, etc.). The output angle and out-coupling height for a ray leaving the second optical surface 410-2 depend on the angle of the wedge (e.g., the acute angle 434), the location of the light source (e.g., point source), refractive index of the prism and the angle of incidence of the ray on the surface normal (e.g., the input angle) on the third optical surface.

FIG. 5C shows a plot 540 that shows an output angle of the ray as a function of its input angle. In some embodiments, for a waveguide wedge 410 having a refractive index of 1.5, the output angles from the wedge 410 into an air medium is greater than, 65° and less than 90°. For refractive index that is even higher, the output angle will be even steeper (e.g., the output angles from the wedge 410 having an index of refraction greater than 1.5 may be greater than 70°, or greater than 75°).

FIG. 5C also shows that for a ray having a particular output angle value (e.g., an output angle having a value marked with a line 544), there are multiple possible values of input angles. This is shown also in FIG. 6D, where a ray 630 of a particular output angle can be found in three distinct bundles, each out-coupled at a different height. The rays 630 have different input angles even though they all have the same output angle.

A line 546 in the plot 540 in FIG. 5C shows a discontinuous jump in the output angle as a function of input angle. A series 548 of output angles corresponds to a bundle of rays having various output angles, and the smallest input angle value in the series 548 is marked by a line 546. Rays having input angles smaller than the value marked by the line 546 undergo total internal reflection, and is not out-coupled in the zone of the wedge 410 where the series 548 of rays are output.

FIG. 6A shows the wedge 490 (e.g., the wedge 490 in FIG. 4C) in which rays guided within the wedge 490 leak out (e.g., when the incident angle of a particular ray no longer meets the total internal reflection condition) from both the first optical surface 490-1 and the second optical surface 490-2, at for example, a region 610-1 on the first optical surface 490-1 and a region 610-2 on the first optical surface 490-1. The locations 610-1 and 610-2 are spatially separated on the first optical surface 490-1.

In some embodiments, rays that do not meet the total internal reflection condition only exit from the second optical surface 490-2. For example, FIG. 6B shows a reflective element 620-1 (e.g., a reflective coating) disposed in the first region 610-1 to ensure that rays striking that first region are reflected regardless of whether or not they meet the total internal reflection condition. As a result, there is reduced (e.g., no) leakage of light in the first region 610-1. In some embodiments, the reflective element 620-1 is deposited in the first region 610-1, and a similar reflective element 620-2 is disposed in the second location 610-2. In some embodiments, the reflective element 620-1 is coated on the first region 610-1 (e.g., the reflective element 620-1 is a reflective coating that is placed over the first region 610-1 of the first optical surface 490-1).

In some embodiments, the reflective elements (e.g., 620-1, . . . 620-$n$) transmit radiation in the visible spectrum (e.g., radiation having a wavelength between 400 nm-800 nm) while reflecting radiation in the near-infrared spectrum (e.g., radiating having a wavelength between 800 nm-2500 nm) or the infrared spectrum. Such a reflective element is also known as a "hot mirror." In some embodiments, the hot mirror includes a dielectric coating designed to transmit visible wavelengths and reflect near-infrared wavelengths. In some embodiments, the reflective element comprises a metallic or a dielectric layer. In some embodiments, the reflective element is at least partially transmissive of visible wavelengths. In some embodiments, an optical system has three or fewer reflective elements on the first optical surface 490-1 (e.g., depending on the geometry of the waveguide wedge 490 and the numerical apertures of the optics). In some embodiments, an optical system has three or more regions of reflective elements on the first optical surface 410-1(e.g., depending on the geometry of the waveguide wedge 410, and the numerical apertures of the optics).

The rays that do not meet the total internal reflection condition at the first location 610-1 (but are still reflected by the first reflective element 620-1) will not meet the total internal reflection condition at the region 612-1 on the second optical surface 410-2. This is because the incidence angles of a ray become smaller as the ray propagates further along the y-axis between the two non-parallel optical surfaces, namely the optical surfaces 410-1 and 410-2. The rays that do not meet the total internal reflection condition at the region 612-1, which includes rays that did not meet the total internal reflection condition at the first location 610-1, and rays that did meet the condition at the first location 610-1 but no longer meet the condition at the region 612-1 will be at least partially refracted (instead of being reflected) at the interface of air and the second optical surface 410-2.

Rays that meet the total internal reflection condition at the region 612-1 will be reflected to the second location 610-2. Rays reaching the second location 610-2 will get reflected by the reflective element 620-2. In this way, rays cease to propagate along the y-direction within the wedge 490 by exiting from the wedge 490 through the second optical surface 410-2, when the incidence angle of the rays do not meet the total internal reflection condition on the second optical surface 490-2.

FIG. 6C is a perspective view of the wedge 410, including the reflective elements 620-1, 620-2, and 620-3 on the first optical surface 490-1.

FIG. 6D shows a cross-sectional view of the wedge 410 on the y-z plane, compared to the perspective view of the same wedge in FIG. 6C. As shown in FIG. 5D, each light bundle exiting a particular out-coupling region (e.g., 612-1) can contain a ray (e.g., ray 630) having an output angle that is also present in another exit bundle from another out-couple region (e.g., 612-2). In some embodiments, there is a unique correspondence between i) an input angle at the third optical surface 410-3 and ii) a combination of an output angle and an out-coupling height at the second optical surface 410-2.

Figure 6E:
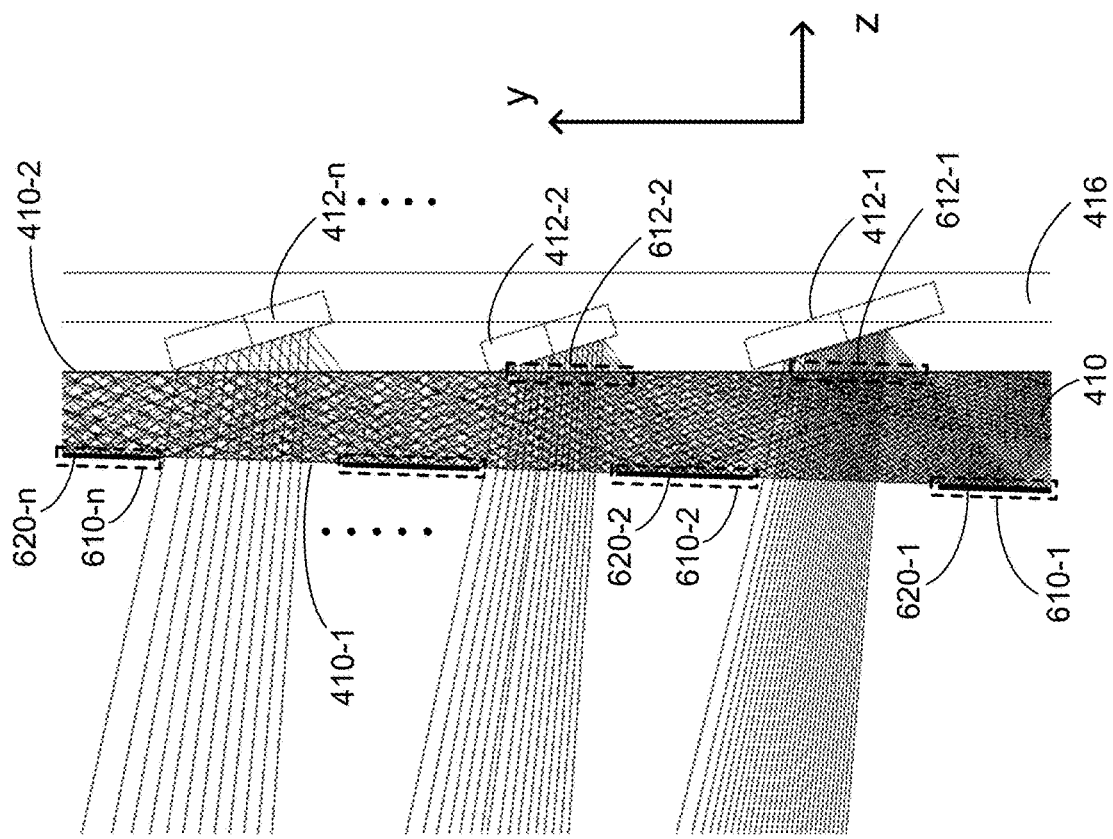
FIG. 6E shows an optical system in accordance with some embodiments in accordance with some embodiments.
Figure 6D:
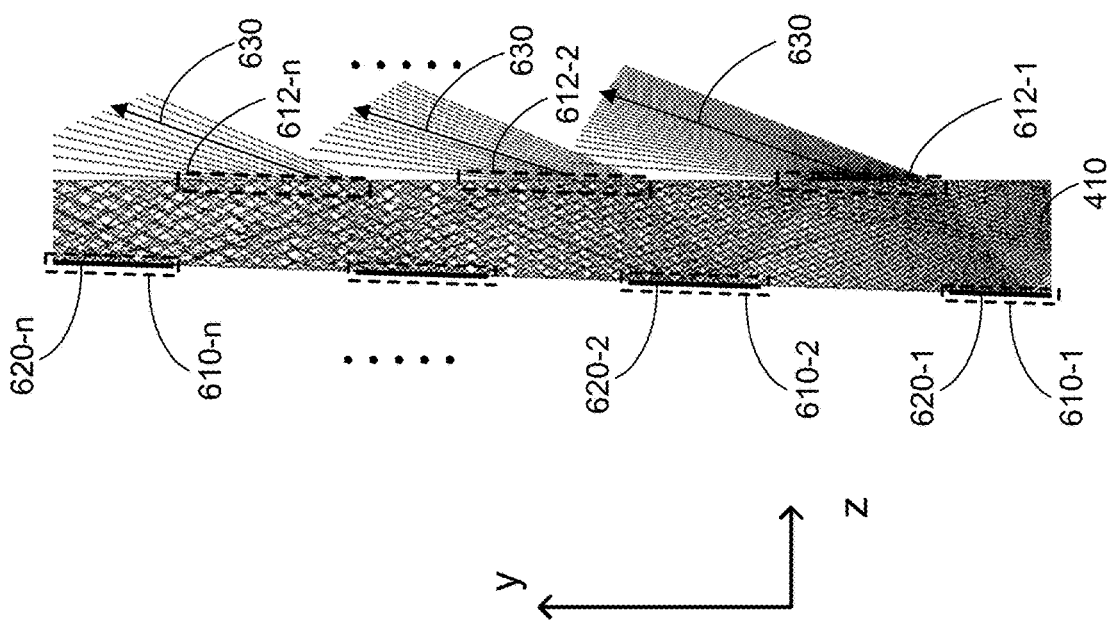
FIG. 6D shows rays exiting from a single surface of an optical element in accordance with some embodiments.

FIG. 6E shows a portion of the wedge 410 and a number of optical elements 412-1, 412-2, . . . 412-*n* arranged along the y-axis and positioned adjacent to the second optical surface 410-2 of the wedge 410. In some embodiments, there are n optical elements arranged along the y-axis and positioned adjacent to the second optical surface 410-2 of the wedge 410.

In some embodiments, rays guided through the wedge 410 reflect one or more times off the first optical surface 410-1 and/or the second optical surface 410-2. When the rays approach the second optical surface 410-2 at a first angle, with respect to the second optical surface 410-2, that is greater than the critical angle, they are reflected by the second optical surface 410-2 through total internal reflection at an angle having a same magnitude as the first angle with respect to the second optical surface 410-2. If the respective optical element 412-1, positioned adjacent to the region 612-1, receives a bundle of rays that approaches the second optical surface 410-2 at angles that are less than the critical angle (e.g., because the bundle of light is not entirely reflected by the second optical surface 410-2 by total internal reflection and thus, at least partially exits from the wedge 410), the respective optical element 412-1 directs the bundle of light back toward the first optical surface 410-1 at a second angle, different from the first angle, with respect to the second optical surface 410-2. Angles, as used throughout this description, are measured (or indicated) using both signs and magnitudes. At a particular reflection surface, a ray has an angle of incidence that has the same magnitude as an angle of reflection, but the signs on those two angles are different and the two angles (e.g., the angle of incidence and the angle of reflection) are thus different.

In some embodiments, rays are reflected within the first optical element via total internal reflection (prior to reaching the respective optical element 412). In some embodiments, rays that have been directed by the respective optical element 412 exit the wedge 410 (through the optical first optical surface 410-1 of the wedge waveguide) because the incident angle of the rays on the first optical surface 410-1 is less than the critical angle. In some cases, the rays are refracted (i.e., not reflected) upon exiting through the air-first optical surface 410-1 interface. As shown in FIG. 6E, the rays exit the wedge 410 at a location on the first optical surface 410-1 that are located between two adjacent reflective elements (e.g., between the reflective elements 620-1 and 620-2). There are no reflective elements are located at a location on the first optical surface 410-1 where the light rays exit the wedge 410.

In some embodiments, after exiting the wedge 410, the rays illuminate an object (e.g., an eye of a user wearing a device that includes the optical system 400). By allowing rays guided within the wedge 410 to be separated into a plurality of portions (based on whether particular rays meet the total internal reflection condition at a respective y-axis position on the second optical surface 410-2 of the wedge 410), respective portions of the plurality of portions of the rays are transmitted through the first optical surface 410-2 at discrete (e.g., spatially separated) locations to illuminate one or more portions of an object (e.g., the eye). For example, in some embodiments, the respective portions of the plurality of portions of the rays are transmitted through the first optical surface 410-1 at discrete locations to illuminate the object across a height (e.g., along the y-direction) of the object (e.g., an entire front surface of the object is illuminated).

In some embodiments, the wedge 410 behaves as a waveguide (in that the wedge 410 allows propagation of light along the y-direction via total internal reflection, and hence, the wedge 410 is also called herein a wedge waveguide). In some embodiments, the respective optical element 412-1 receives rays that do not meet the total internal reflection condition and have leaked out from the region 612-1 by transmitting through the second optical surface 410-2. "Leaking out" of light, as described herein, is a type of light extraction—which is any process by which light escapes a waveguide. The respective optical element 412-1 directs the transmitted rays back toward the first optical surface 410-1 by directing those rays first through the second optical surface 410-2 of the wedge 410 and back into the wedge 410. The rays that are directed back toward the first optical surface 410-1 have different angles with respect to the second optical surface 410-2 as compared with the angles (with respect to the second optical surface 410-2) of the rays received by the respective optical element 412-1.

In some embodiments, the optical element 412-1 is a reflector, and directing the rays back toward the first optical surface 410-1 involves reflecting the rays at the reflector. In some embodiments, the optical element 412-1 is a diffractive element, and directing the rays back toward the first optical surface 410-1 involves diffraction (e.g., backward diffraction) of the rays at the diffractive element. In some embodiments, the optical element 412-1 is a refractive element, and directing the rays back toward the first optical surface 410-1 involves refracting the rays in the refractive element (e.g., a retroreflector prism, such as a pentaprism).

In some embodiments, a substrate 416 is located adjacent to the second optical surface 410-2 of the wedge 410, and the plurality of optical elements (e.g., 412-1 to 412-*n*) is coupled with the substrate. In some embodiments, the plurality of optical elements 412-1 to 412-*n* is positioned on the substrate. In some embodiments, the plurality of optical elements 412-1 to 412-*n* is embedded at least partially in the substrate. The locations (e.g., along the y-axis) of the plurality of optical elements are configured to match extraction zones (e.g., regions where the rays leak out or get transmitted, optionally with refraction, through the second optical surface 410-2) of the wedge waveguide. In some embodiments, the respective optical element of the plurality of optical elements has a curved surface, and a reflective film is disposed on the curved surface. In some embodiments, the curvature of the curved surface is tuned to control the beam profile, direction and/or the etendue of the light transmitted through the first optical surface 410-1 (for illuminating an object to be imaged), or transmitted through the third optical surface 410-3 (when the rays are used to image the object). The etendue characterizes how "spread out" the light is in area and angle. In some embodiments, the respective optical element of the plurality of optical has a flat surface, and a reflective film is disposed on the flat surface. In some embodiments, the plurality of optical elements is integrally formed (e.g., as a single component, optionally made by injection molding).

In some embodiments, the substrate 416 is any medium within which or on the surface of which an array of chirped gratings is inscribed. In a chirped grating, the refractive index profile of the grating is modified to add features, such as a linear variation in the grating period (called a chirp). The reflected wavelength changes with the grating period, broadening the reflected spectrum. A grating possessing a chirp has the property of adding dispersion (e.g., different wavelengths reflected from the grating are subjected to different delays). In some embodiments, this allows the development of phased-array antenna systems and polarization mode dispersion compensation.

The plurality of optical elements and the reflective elements (e.g., 620-1 to 620-*n*) are offset from one another along the y-direction because the light extraction zones and the reflective elements are vertically displaced from one another. In some embodiments, the reflective elements 620-1 to 620-*n* and the elements used on the plurality of optical elements are identical, but the reflective elements do not interfere or intersect with one another because of the displacement along the y-axis.

In some embodiments, the optical element 412-1 has a spatially varying refractive index profile. In some embodiments, the optical element 412-1 is a volume Bragg grating or a polarization volume grating. In some embodiments, the respective optical element of the plurality of optical elements directs light having a first wavelength and transmits light having a second wavelength (as further discussed with respect to FIG. 8). In some embodiments, the first wavelength is equal to or longer than 750 nm, and the second wavelength is shorter than 750 nm. In some embodiments, the plurality of optical elements allows visible light to be transmitted, and the plurality of optical elements is placed in front of a user's eyes without obstructing the user's view of the surroundings.

Figure 7A:
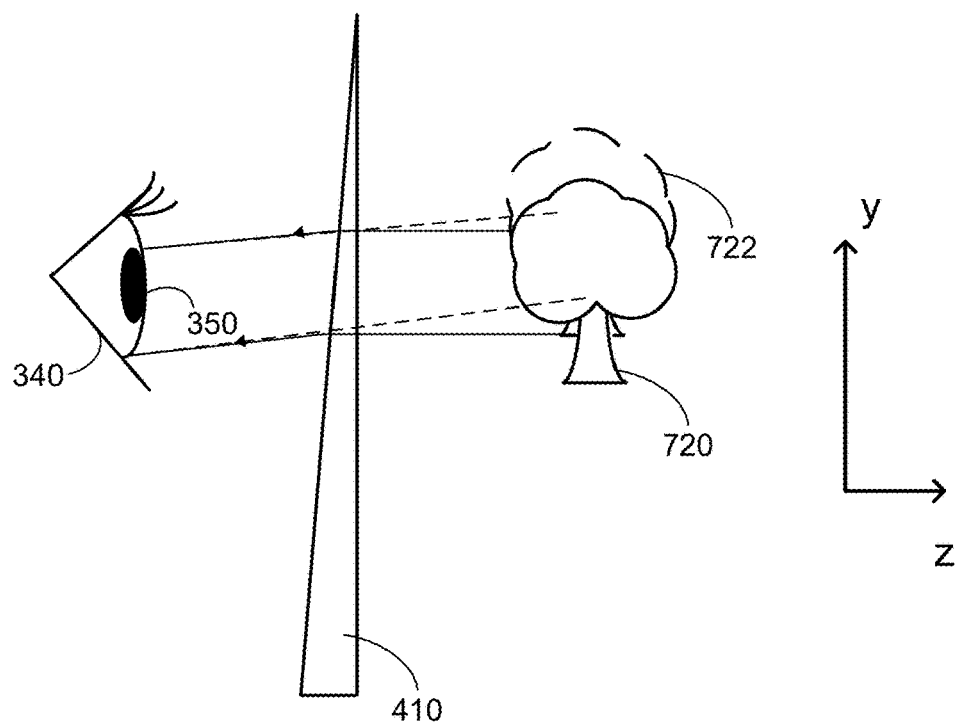
FIG. 7A illustrate an example prism effect.

In some embodiments, the wedge 410 causes a prism effect as shown in FIG. 7A due to the non-parallel surfaces 410-1 and 410-2. The prism effect causes color fringing as well as displacement of the apparent position of objects in a scene. The trajectories of rays shown in FIG. 7A are exaggerated to illustrate the prism effect. They are not drawn to scale. Light from an object 720 that is in front of an eye 340 appears to the eye 340 as coming from a higher y-axis position because of the refraction of the rays. As a result, the eye 340 of a user sees an image 722 that is offset (e.g., along the y-axis) compared to the real object 720. When the wedge 410 is used in a head-mounted display device used for augmented reality operations, the displacement can cause a misalignment between a projected image (e.g., an image from a display device) and a transmitted image. In addition, such displacements and/or color fringing effects lead to eye-fatigue and discomfort for the user.

Figure 7B:
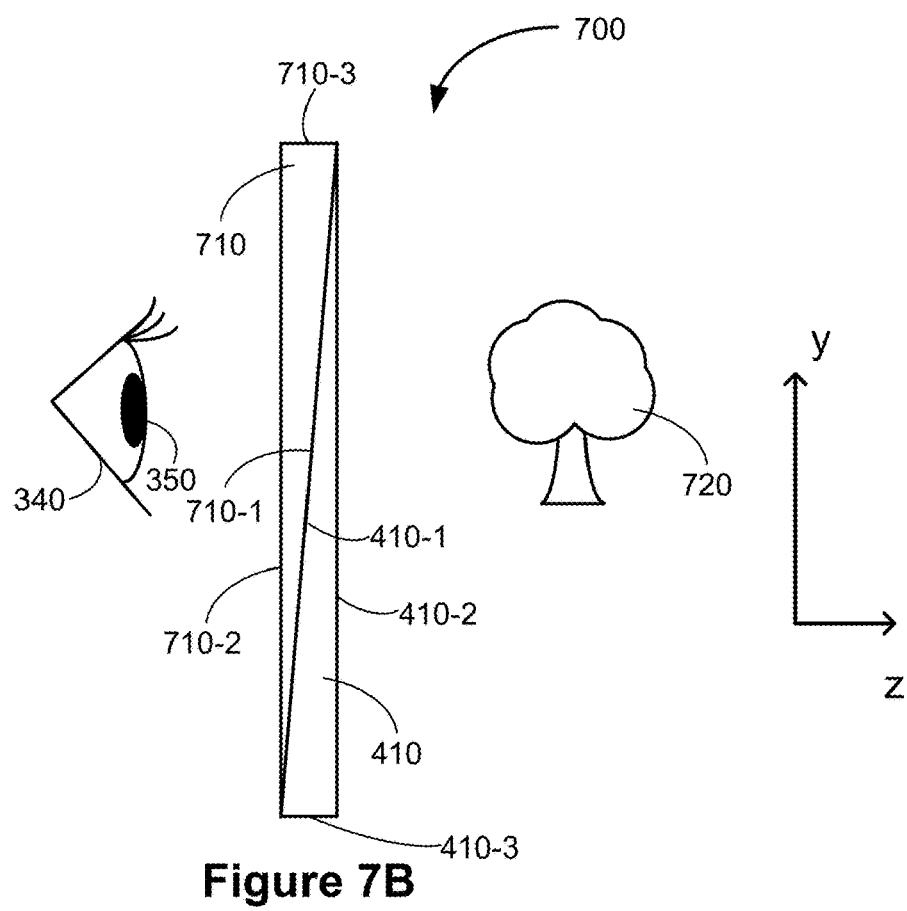
FIG. 7B shows a configuration with a reduced prism effect in accordance with some embodiments.

Adding a complementary wedge 710 as shown in FIG. 7B allows rays from the object 720 to travel through two parallel surfaces 410-2 and 710-2 before reaching the eye. The complementary wedge 710 is oriented in an anti-parallel fashion with respect to the wedge 410. In this way, the object 720 does not appear displaced along the y-axis to the eye 340. The complementary wedge 710 is arranged so that its slanted surface 710-1 is adjacent to the corresponding first optical surface 410-1 of the wedge 410. In some embodiments, the complementary wedge 710 is in contact with the wedge 410 (e.g., the first optical surface 410-1 of the wedge 410 is in contact with the first optical surface 710-1 of the complementary wedge 710). In some embodiments, the complementary wedge 710 is separated from the wedge 410 (e.g., by an air gap). For example, one or more layers of material having an index of refraction that is distinct from an index of refraction of a material forming the wedge 410 is located between the complementary wedge 710 and the wedge 410. In some embodiments, the slanted surface 710-1 and the surface 710-2 form an acute angle that is identical to the acute angle between the first optical surface 410-1 and the second optical surface 410-2. In some embodiments, the surface 710-3 makes a right angle with the surface 710-2.

Figure 7D:
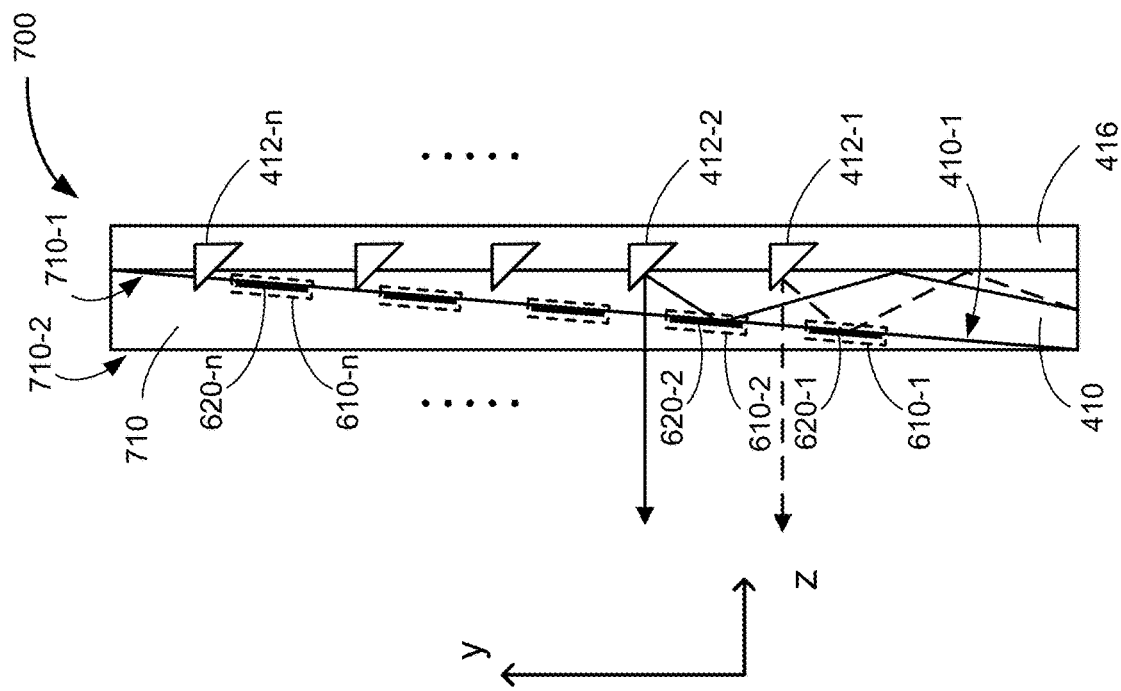
FIG. 7D shows an optical system in accordance with some embodiments.

FIG. 7D shows an example optical system 700, which includes the complementary wedge 710, the wedge 410 as described with respect to, for example, FIG. 6B, and an array of n optical elements 412-1, 412-2, . . . 412-*n*. The complementary wedge 710 shown in FIG. 7D can be used in combination with various optical systems illustrated herein (e.g., in FIG. 4B, FIG. 4E, etc.). Rays that are directed toward the first optical surface 410-1 from the array of optical elements 412 now exit through the first optical surface 410-1 of the wedge 410 and enters through the corresponding surface 710-1 of the complementary wedge 710. The rays exit the complementary wedge 710 from the surface 710-2. In some embodiments, the rays exiting the wedge 710 illuminate an object.

If there is no separation (e.g., by air, or by a different medium) between the complementary wedge 710 and the wedge 410, and the two wedges are made of the same material, rays that would have been reflected by total internal reflection within a stand-alone wedge 410 will no longer be reflected by total internal reflection at the second optical surface 410-1, which abuts the 710-1 surface, but would instead transmit into the complementary wedge 710. The combined arrangement in that case would be similar to that of a parallel rectangular piece of material formed of the wedge 410 and the complementary wedge 710, like a window.

Figure 7C:
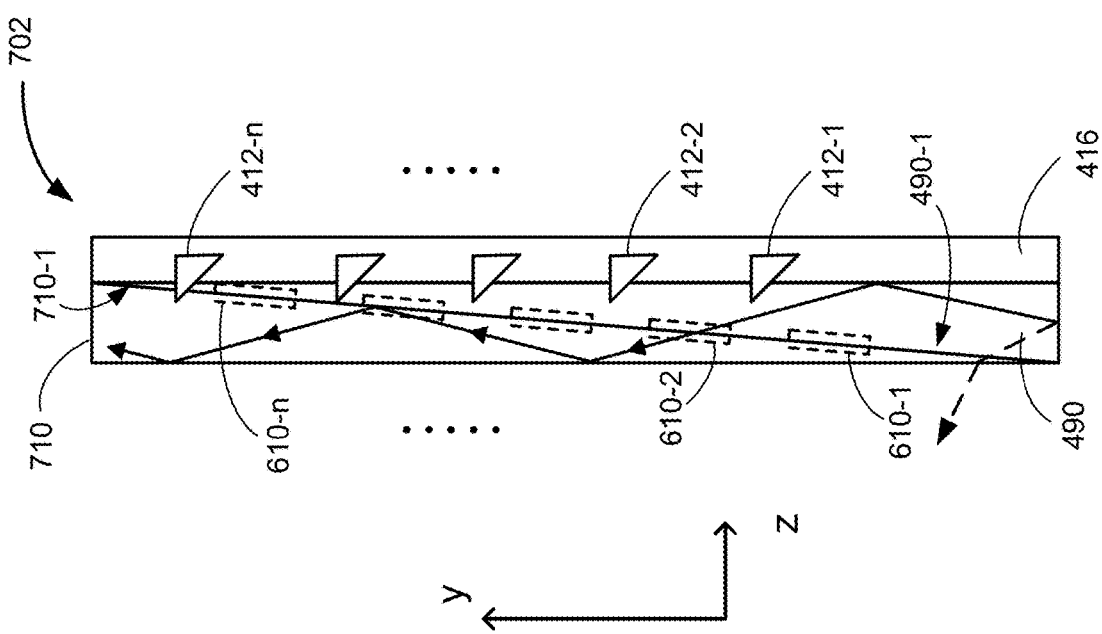
FIG. 7C shows an optical system in accordance with some embodiments.

In FIG. 7C, a second optical system 702 includes a complementary wedge 710 and a wedge 490 that does not contain any reflective elements at the locations 610-1, 610-2 on the first optical surface 490-1 of the wedge. Rays that strike those locations on the first optical surface 490-1 are transmitted (e.g., not reflected) through the first optical surface 490-1, and out of the wedge 490 when the rays do not meet the total internal reflection condition at those locations. Those rays enter the complementary wedge 710 through a surface 710-1 of the complementary wedge 710.

In some cases, at least a portion of the rays in complementary wedge 710 propagates in complementary wedge 710 via total internal reflection (shown in a solid line). In some cases, at least a portion of the rays in complementary wedge 710 is refracted and transmitted out of the complementary wedge 710 if the rays do not meet the total internal reflection condition at the second optical surface 710-2 (shown in a dashed line).

Figure 7E:
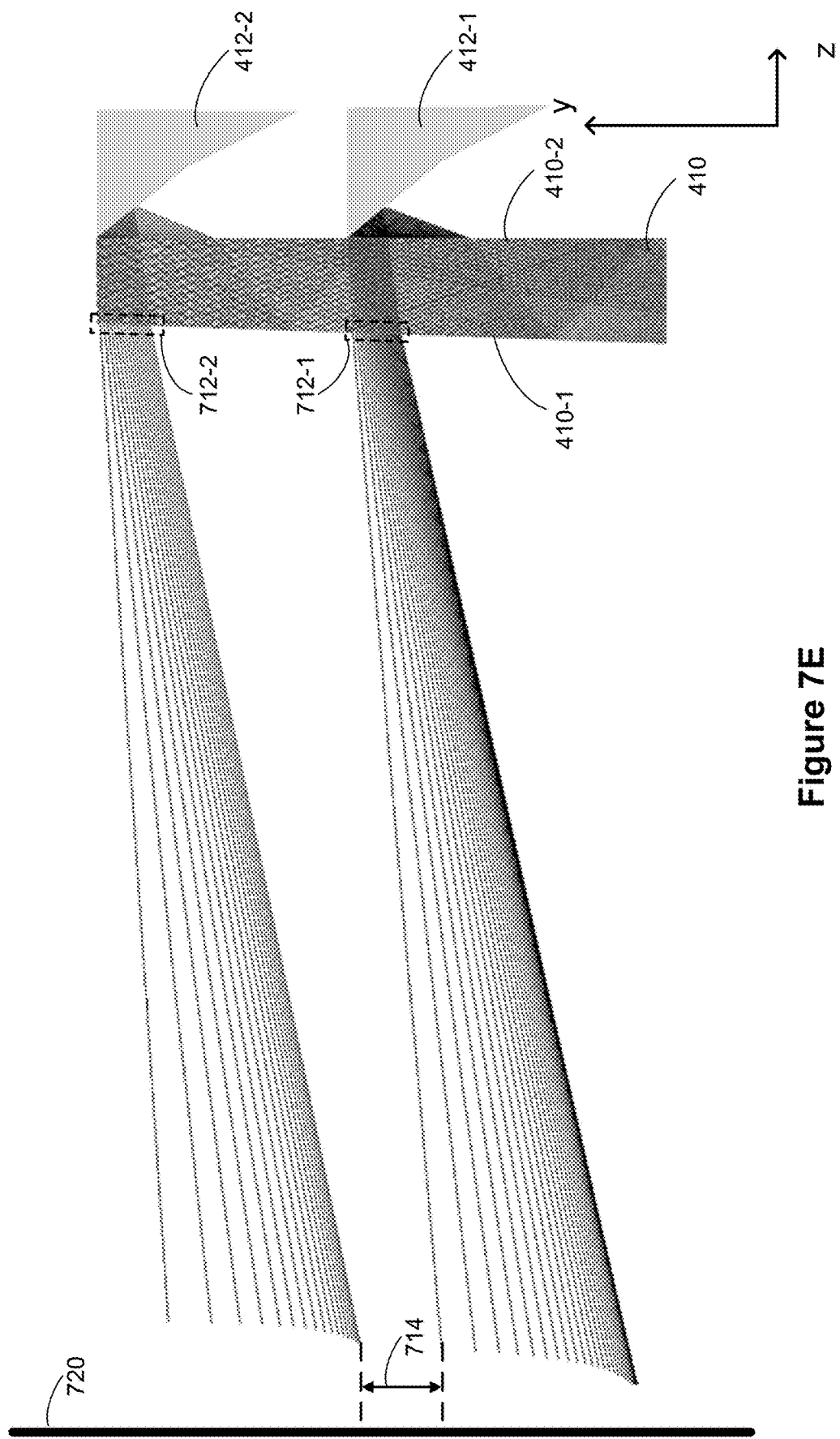
FIG. 7E shows an enlarged view of a portion of an optical system in accordance with some embodiments.

FIG. 7E shows rays directed by optical elements 412 in accordance with some embodiments. The rays shown in FIG. 7E travel toward the object 720 (e.g., an eye), similarly to the depiction of rays in FIG. 4B. In some embodiments, the rays from the object 720 travel toward the wedge 410, similarly to the depiction of rays in FIG. 4E.

In the embodiments where the rays shown in FIG. 7E travel toward the object 720, the rays that are directed toward the first optical surface 410-1 by the respective optical elements 412-1 and 412-2 exit the wedge 410 at locations 712-1 and 712-2, respectively. Because rays that do not meet the total internal reflection condition approach the second optical surface 410-2 over a range of angles, these rays exit from the wedge 410 and are directed by the respective optical elements 412-1 and 412-2 toward the first optical surface 410-1 over a range of angles. The rays then exit the wedge 410 and illuminate the object at a range of angles. The angular spectrum (e.g., the range of angles) allows rays to illuminate the object at different positions along the y-axis. FIG. 7E shows the rays exiting the wedge 410 through the region 712-2 spread along the y-axis direction and provide a wider illumination at the object compared to the vertical (e.g., y-axis) extent of the rays at the region 712-2. In some cases, there is a gap 714 where rays do not illuminate the object 720, depending on the distance from the wedge 410 to the object 720, the angular spread of the rays exiting from the wedge 410, and the spacing between the optical elements 412.

In addition, when the wedge 410 is used for imaging the object 720, in some embodiments, rays from one or more regions of the object 720 (e.g., the gap 714) are not guided through the wedge 410. For example, in some cases, one or more regions of the first optical surface 410-1 of the wedge 410 are covered by reflective elements, which prevent certain rays from the object 720 from entering through the first optical surface 410-1. In some cases, rays from one or more regions of the object 720 enter the wedge 410, but such rays are not reflected by a respective optical element 412, or even if they are reflected by a respective optical element 412, the reflected rays do not impinge on the first optical surface 410-1 at an angle less than the critical angle. As a result, in such embodiments, an image of the object 720, when reconstructed based on rays transmitted to the third optical surface 410-3, will not include one or more portions of the object 720 (e.g., a portion of the object 720 that corresponds to the gap 714).

Thus, in some embodiments, the wedge 410, the optical elements 412, and the distance between the object 720 and the wedge 410 are selected to reduce or eliminate the gap 714. For example, in some embodiments, the respective optical element (e.g., 412-2, 412-1) have different configurations (e.g., different curvatures). When the wedge 410 and the optical elements 412 are used for directing light to illuminate the object 720, the different configurations of the respective optical elements 712 provide different spread of rays (e.g., various arrangements of rays illuminating the object at different angles), which, in turn, reduces the gap 714.

In some embodiments, the rays from the object 720 (shown in FIG. 7E) enters the wedge 410 through the first optical surface 410-1. When a ray transmitted through the first optical surface 410-1 at a first angle, with respect to the second optical surface 410-2, does not meet the total internal reflection condition (and hence, is not reflected by the second optical surface 410-2) at the second optical surface 410-2, it is directed by the respective optical element (e.g., 412-2, 412-1, etc.) back toward the second optical surface 410-2 at a second angle, with respect to the second optical surface 410-2, that is different from the first angle. In some embodiments, the ray that has been directed by the respective optical element is reflected at the first optical surface 410-1 (e.g., via total internal reflection, or by a reflective element disposed on the first optical surface 410-1).

When the rays entering at the locations 712-1 and 712-2 meet the total internal reflection condition at the second optical surface 410-2, they are reflected by total internal reflection and guided within the wedge 410 toward the third optical surface 410-3. As explained in FIG. 4E, the incidence angle of a ray increases as it propagates in the negative y-direction. If a ray meets the total internal reflection condition at a higher y position of the wedge 410, it will continue to meet the total internal reflection condition as it propagates in the negative y-direction.

In some embodiments, the rays transmitted through the first optical surface 410-1 at a first angle with respect to the second optical surface 410-2 do not meet the total internal reflection condition at the second optical surface 410-2 (e.g., the first angle is less than the critical angle of the wedge waveguide). A respective optical element (e.g., 412-2) of the plurality of optical elements directs the rays back toward the first optical surface 410-1 at a second angle with respect to the second optical surface 410-2. The second angle with respect to the second optical surface 410-2 is different from the first angle with respect to the second optical surface 410-2.

In some embodiments, the respective optical element 412-2 directs the ray back toward the first optical surface 410-1 and the ray strikes the first optical surface 410-1 at an angle that is equal or greater than the critical angle of the wedge waveguide. In such embodiments, as explained with respect to FIG. 4E, the incidence angle of the ray as it is guided through the wedge waveguide (along the y-direction) increases with every reflection. The ray is then out-coupled at the third optical surface 410-3 at a particular angle. In some embodiments, the first optical surface 410-1 reflects the light that has been directed by the respective optical element (via total internal reflection or based on reflection by the reflective element disposed on the first optical surface 410-1).

In some embodiments, the detector placed adjacent to the third optical surface 410-3 is an angle-resolving detector (e.g., a camera that converts incident angle of incoming light into spatial locations on a sensor of the camera; for example, a pinhole camera or a camera with a lens), the angle of that particular ray can be ascertained. As shown in FIG. 5C, there is a one-to-one relationship between a ray entering the wedge at a particular height at a particular entrance angle to a ray arriving at the angle-resolving detector at a particular angle. As a result, rays received by an angle-resolving detector covering a particular angular spectrum convey information about the object at a range of heights, allowing reconstruction of the image of the object across the y-direction.

In some embodiments, the respective optical element (e.g., 412-2) directs the ray back toward the first optical surface 410-1 and the ray strikes the first optical surface 410-1 at an angle that is less than the critical angle of the wedge waveguide. If there is no reflecting element at the location where the ray is directed, the ray will at least partially leak out of the wedge waveguide and not be detected at the detector.

If, on the first optical surface 410-1, there is a reflective element at the location where the ray is directed, the ray will reflect, even if the total internal reflection condition is not met. The reflected ray will then strike the second optical surface 410-2. If that ray striking the second optical surface 410-2 meets the total internal reflection condition on the second optical surface 410-2, the ray is reflected by the second optical surface 410-2. Subsequently, the ray is guided within the wedge waveguide until it exits the wedge 410 through the third optical surface 410-3 (because the incidence angle increases as the ray reflects).

If the ray that was reflected by the reflective element at the first optical surface 410-1 still does not meet the total internal reflection condition at the second optical surface 410-2, the ray exits from the wedge 410 and the respective element of the plurality of optical element will direct that ray back to the first optical surface 410-1.

In FIG. 7E, when rays from the object 720 propagate toward the wedge 410, a portion of the rays in each bundle of rays from a respective region of the object 720 is accepted and transmitted through the first optical surface 410-1 of the wedge, at a respective location (e.g., 712-2, 712-1) on the first optical surface 410-1 of the wedge 410. The respective bundle of rays travels to the second optical surface 410-2 at a first angle with respect to the second optical surface 410-2. If the first angle is less than the critical angle of the material of the wedge 410, the respective bundle of rays will leak out of the wedge 410 and be directed by the respective optical element (e.g., 412-2) back toward the first optical surface 410-1. The angular spectrum (e.g., a range of angles) of the bundle of rays that are directed by the respective optical element depends on the angular range of light initially accepted through the first optical surface 410-1 into the wedge 410.

The rays in FIG. 7E are shown for illustrative purposes. In some embodiments, additional rays propagating from the object 720 at different angles (e.g., angles other than those shown in FIG. 7E) are still guided within the wedge 410. For example, rays propagating from the object 720 at an angle that is substantially parallel to the z-axis (e.g., the rays travel at an angle of less than 20° with respect to the z-axis, the rays travel at an angle of less than 10° with respect to the z-axis, etc.) enter the wedge 410 and are redirected by a respective optical element 412 for transmission within the wedge 410 via total internal reflection.

In some embodiments, for accepting light from the object 720, the respective optical element (e.g., 412-2, 412-1) has a different configuration (e.g., different curvature) to accept and guide rays from light bundles that have different spread of rays (e.g., various arrangements of rays at different angles) to increase the extent of light captured from the object 720. In some embodiments, the respective optical element (e.g., 412-1, 412-2) is designed to accept light propagating from the object and entering the wedge 410 at a wider range of angles and direct those rays towards the detector (e.g., by directing the light in a particular direction with particular angular spread so that the light propagates within the wedge 410 via total internal reflection).

In some embodiments, the orientations of the plurality of optical elements (e.g., a surface normal or an optical axis of an optical surface of each optical element) are the same. As a result, a ray striking any one of the plurality of optical elements at a same incident angle (and at a same location on the optical surface of the respective optical element, if the optical surface is a curved surface) will be directed toward the first optical surface 410-1 at the same angle. In some embodiments, the orientations of the plurality of optical elements are different. As a result, a ray striking any one of the plurality of optical elements at a same incident angle (and at a same location on the optical surface of the respective optical element, if the optical surface is a curved surface) will be directed toward the first optical surface 410-1 at a distinct angle depending on the orientation of the optical element directing the ray.

Figure 8:
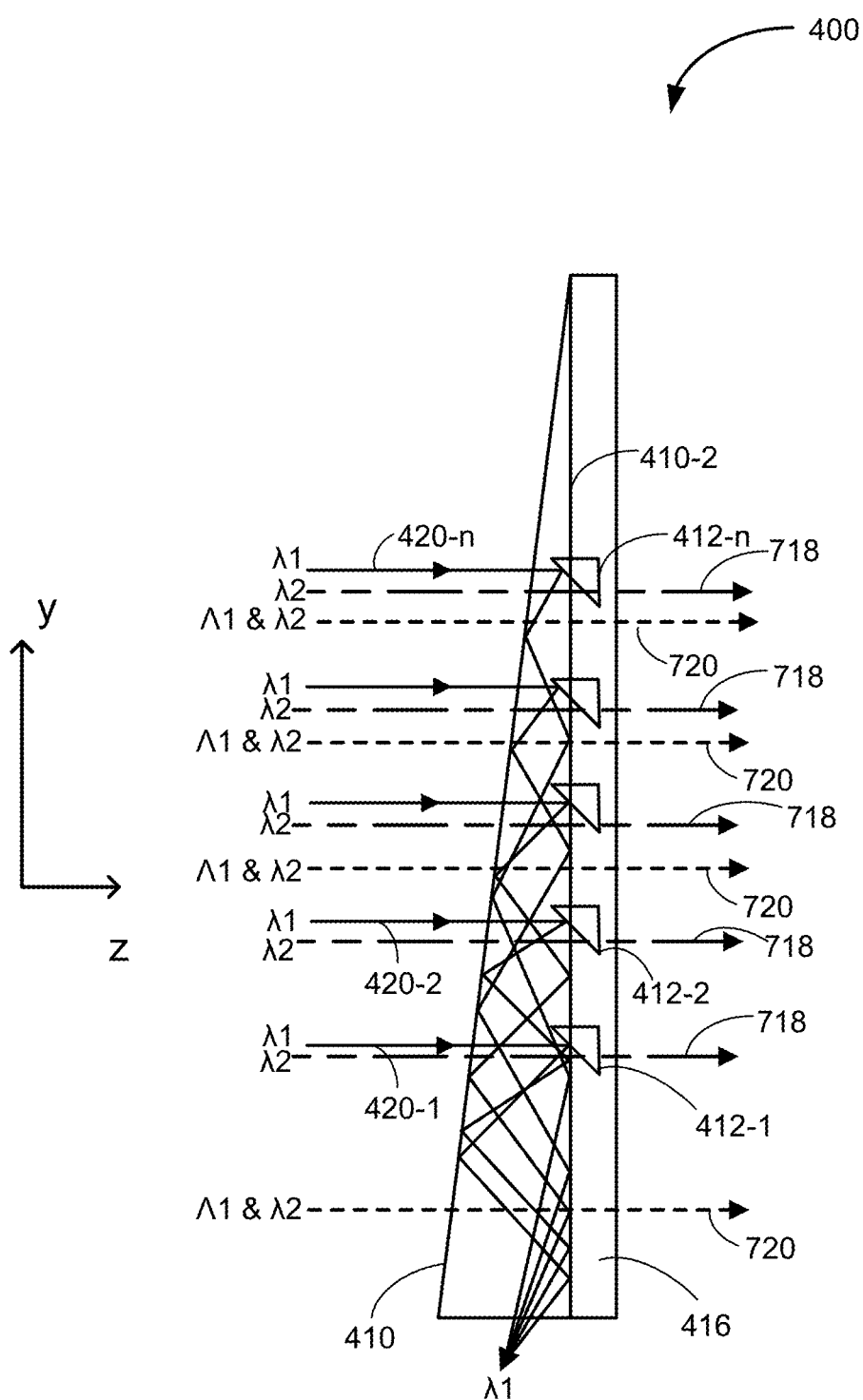
FIG. 8 shows the wavelength-selective nature of an optical system in accordance with some embodiments.

FIG. 8 shows that, in some embodiments, the wedge 410 and the plurality of optical elements 412 are wavelength selective and interact with rays having a wavelength of Xi but not with rays having a wavelength of $\lambda_2$. As shown in FIG. 8, rays 718 having a wavelength of $\lambda_2$ are neither reflected nor diffracted, regardless of whether rays 718 impinge on any optical element 412 or not (e.g., rays 718 are transmitted through the wedge 410 regardless of whether rays 718 impinge on any of the plurality of optical elements 412). In addition, the rays 720 that do not impinge on any optical element 412 (some of the rays 720 have a wavelength of Xi and some of the rays 720 have a wavelength of $\lambda_2$) are neither reflected nor diffracted by the plurality of optical elements, and are simply transmitted through the wedge 410 (and the substrate 416 carrying the plurality of optical elements 412-1 to 412-$n$). In comparison, the rays having a wavelength of Xi and impinging on any optical element 412 are reflected by the optical element 412.

The optical system 400 shown in FIG. 8 uses two main components: the wedge waveguide that has reflective elements on the first optical surface 410-1 and the plurality of optical elements 412 used to steer light (e.g., light outcoupled from the wedge towards an object; or direct light from the object for total internal reflection within the wedge). In some embodiments, the optical system 400 includes a substrate 416 for placing the plurality of optical elements 412. In some embodiments, the optical system 400 includes a complementary anti-parallel wedge for see-through correction.

Figure 9:
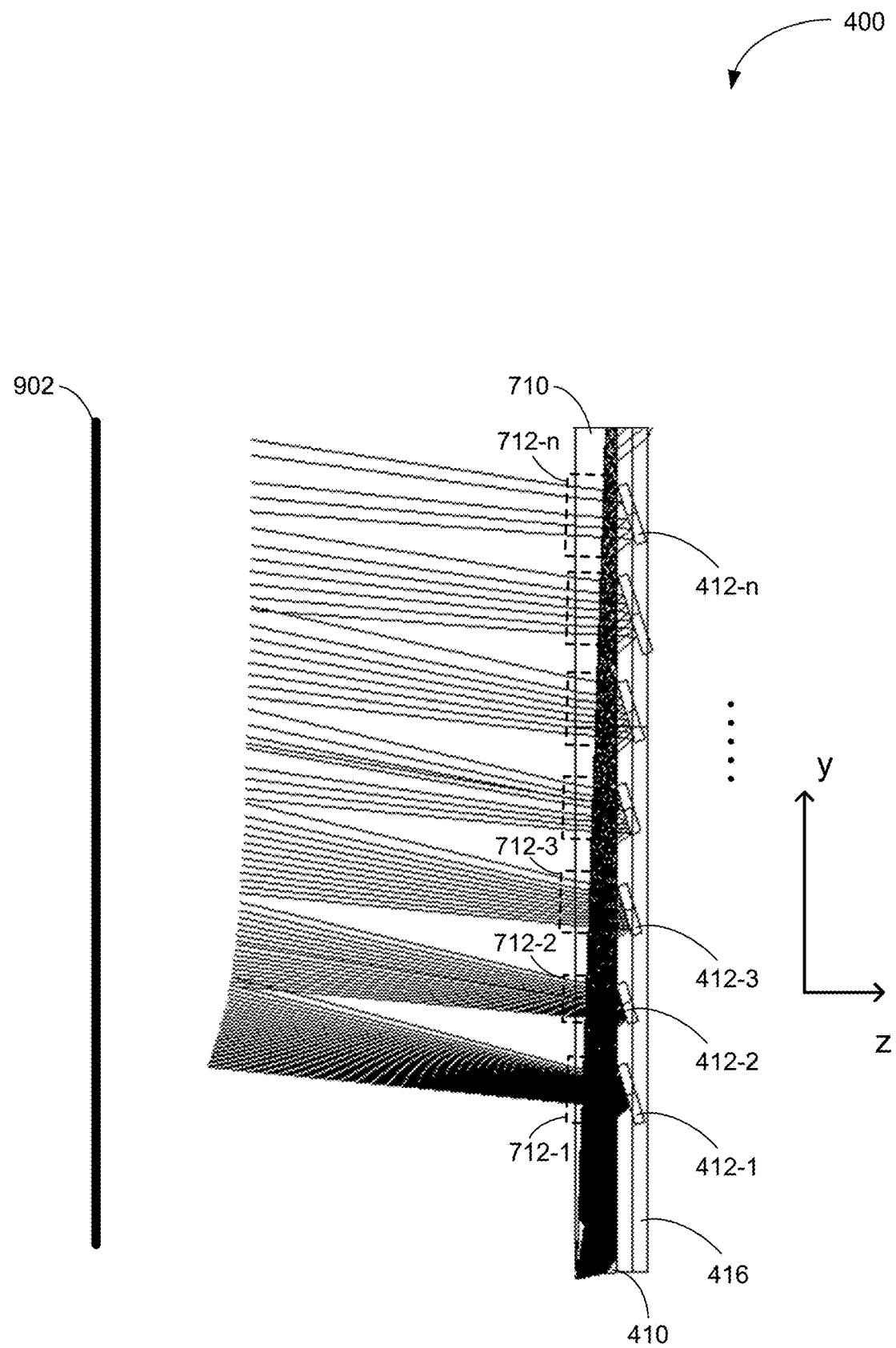
FIG. 9 shows an optical system in accordance with some embodiments.

FIG. 9 shows an optical system 900 in which all of these components are present.

In some embodiments, the optical system 900 is used for illuminating an object 902 (by directing light from a light source toward the object 902). In such embodiments, the rays depicted in FIG. 9 travel toward the object 902. A light source adjacent to the third optical surface 410-3 provides light having a range of angles. The light is received into the wedge waveguide through the third optical surface 410-3 and is separated into a plurality of portions. Respective portions of the plurality of portions are transmitted through the optical first optical surface 410-1 at discrete locations 712-1, 712-2, 712-3, . . . 712-$n$ to illuminate one or more portions of the object (e.g., particular regions of the object each having a shape of a horizontal strip extending along the x-direction). The light transmitted through the optical first optical surface 410-1 enters the antiparallel, complementary wedge 710, before illuminating the object 902. In some embodiments, the plurality of optical elements 412-1 to 412-$n$ are located outside the wedge 410 adjacent to the second optical surface 410-2. In some embodiments, the plurality of optical elements 412-1 to 412-$n$ are embedded in the wedge 410 adjacent to the second optical surface 410-2. The plurality of optical elements 412-1 to 412-$n$ directs components of light that do not meet the total internal reflection condition (e.g., the rays of light make a first angle with respect to the second optical surface 410-2, the first angle is smaller than the critical angle) at the second optical surface 410-2 toward the first optical surface 410-1 in a direction having a second angle that is different from the first angle. Such rays then exit the wedge 410 through the first optical surface 410-1 and enter the complimentary wedge 710 on their way to illuminate the object 720.

In some embodiments, the optical system 900 is used for collecting light from the object 902 (by directing light from the object 902 toward a detector). In such embodiments, the rays depicted in FIG. 9 travel from the object 902 and are received into the wedge 410 (after passing through the complimentary wedge 710) through the first optical surface 410-1 at discrete locations 712-1, 712-2, 712-3, . . . 712-n. The plurality of optical elements 412-1 to 412-n direct light that do not meet the total internal reflection condition (e.g., the rays of light transmit through the first optical surface 410-1 at a third angle with respect to the second optical surface 410-2 that is smaller than the critical angle) at the second optical surface 410-2 back toward the first optical surface 410-1 (e.g., at a fourth angle that is different from the third angle). The rays are then guided (e.g., by total internal reflection and/or by the reflective elements) within the wedge waveguide before exiting the wedge 410 at the third optical surface 410-3 and detected by a detector located adjacent to the third optical surface 410-3. In this way, rays from different height positions of the object 720 are delivered to an image plane.

Figure 10B:
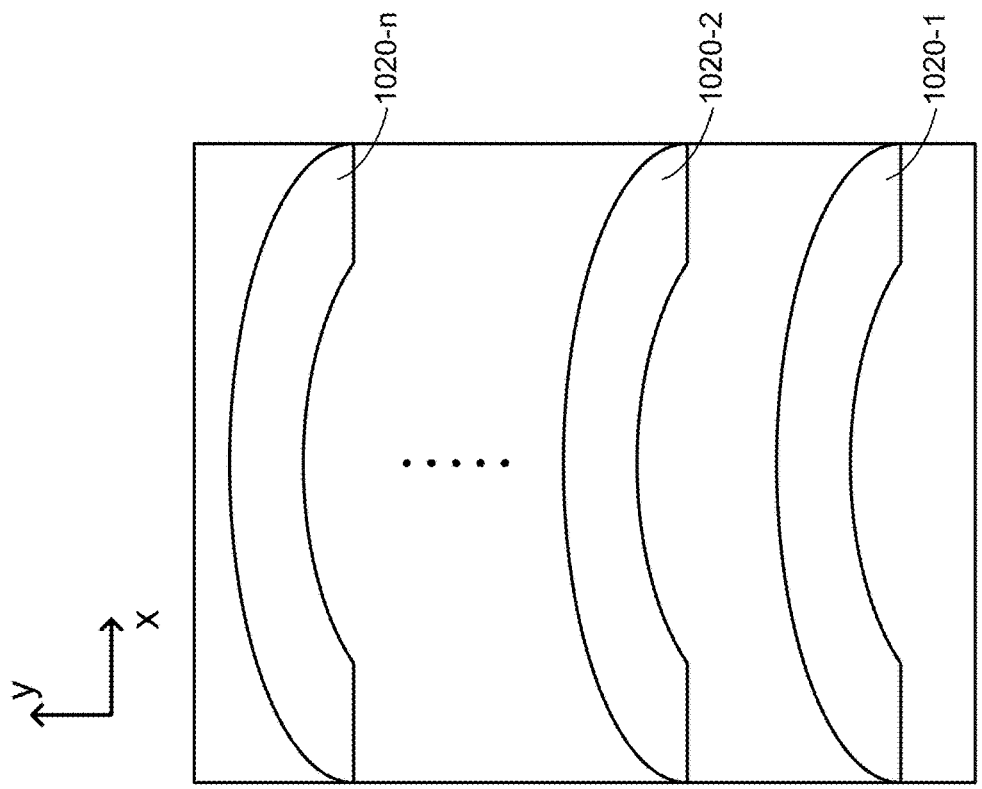
FIG. 10B shows reflective elements in accordance with some embodiments.
Figure 10A:
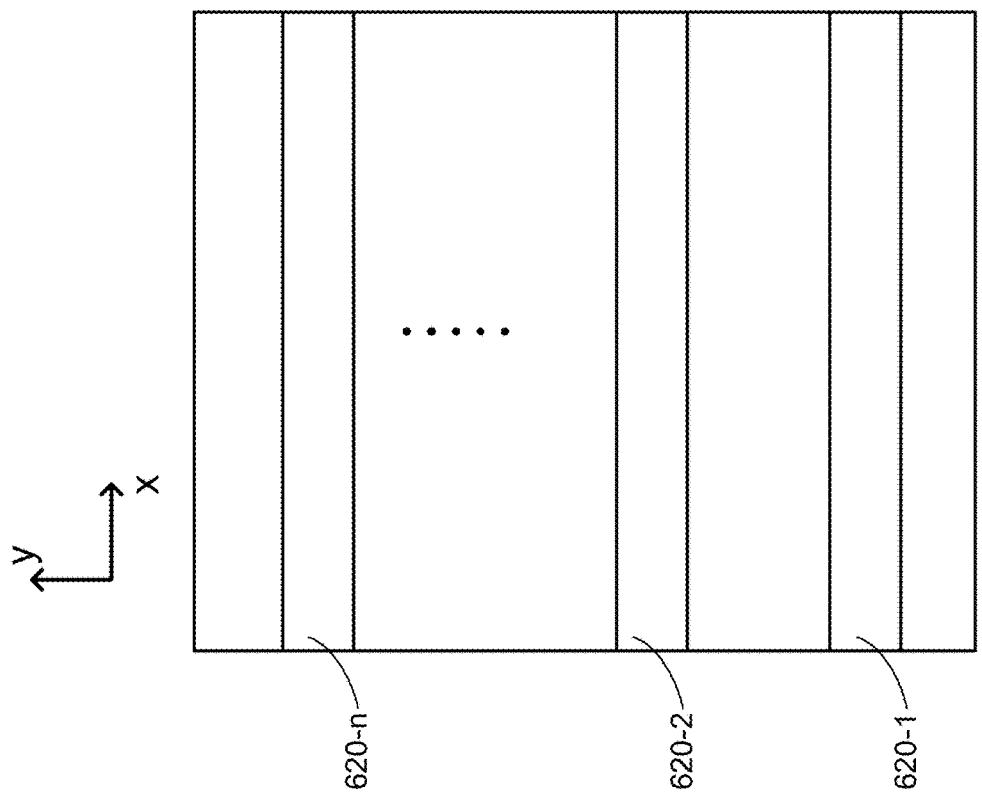
FIG. 10A shows reflective elements in accordance with some embodiments.

FIG. 10A shows rectangular reflective elements 620-1 to 620-n on a first optical surface in accordance with some embodiments. The reflective elements 620-1 to 620-n shown in FIG. 10A are similar to the reflective elements shown in FIG. 6C.

FIG. 10B shows reflective elements 1020-1 to 1020-on a first optical surface in accordance with some embodiments. In some embodiments, the reflective elements have the shapes of arcs, instead of rectangles. In some embodiments, the reflective elements have the shapes of concentric arcs.

In addition to eye-tracking applications, the optical systems and methods described herein are also suitable for machine vision applications where an ability to maintain a visibility of objects is desired and space is constrained.

In light of these principles, we now turn to certain embodiments.

In accordance with some embodiments, an optical system includes a first optical element (e.g., a wedge waveguide as shown in FIGS. 4A-4E and 7E, such as a wedge 410) having at least a first optical surface and a second optical surface (e.g., first optical surface 410-1 and a second optical surface 410-2, FIG. 4A. The first optical surface is not parallel to the second optical surface. The optical system also includes a plurality of optical elements positioned adjacent to the second optical surface of the first optical element. A respective optical element of the plurality of optical elements is configured to receive light transmitted through the first optical surface at a first angle with respect to the second optical surface and direct the light back toward the first optical surface at a second angle, that is distinct from the first angle, with respect to the second optical surface (e.g., FIG. 4E). In addition, or in the alternative, the respective optical element of the plurality of optical elements is configured to receive light guided through the first optical element at a third angle with respect to the second optical surface and direct the light toward the first optical surface at a fourth angle, that is distinct from the third angle, with respect to the second optical surface (e.g., FIG. 4B).

In some embodiments, the respective optical element of the plurality of optical elements is selected from a group consisting of a reflector and a diffraction element.

In some embodiments, light transmitted through the first optical element is from a light source and enters the first optical element through a third optical surface of the first optical element (e.g., FIG. 4B). The third optical surface of the first optical element is distinct from, and mutually exclusive to, the first optical surface and the second optical surface of the first optical element. The light directed toward the first optical surface at the fourth angle with respect to the second optical surface exits the first optical element through the first optical surface of the first optical element to illuminate an object.

In some embodiments, a first portion of the light exits the first optical element at a first location on the second optical surface toward a respective optical element of the plurality of optical elements (e.g., first location 612-1, FIG. 6E). A second portion of the light exits the first optical element at a second location on the second optical surface (e.g., second location 612-2, FIG. 6E). The first location on the second optical surface is spatially separated from (and mutually exclusive to) the second location on the second optical surface.

In some embodiments, light received at the third optical surface is separated into a plurality of portions and respective portions of the plurality of portions are transmitted through the first optical surface of the first optical element at discrete locations to illuminate one or more portions of the object (e.g., FIG. 4B).

In some embodiments, the first optical element has a shape of a wedge (e.g., the wedge 410 in FIG. 4A) and the third optical surface has a surface area that is smaller than both a surface area of the first optical surface and a surface area of the second optical surface (e.g., the first optical surface 410-1 and the second optical surface 410-2 have surface areas greater than the surface area of the third optical surface 410-3).

In some embodiments, object light from the object (e.g., light emitted or reflected by the object) enters the first optical element through the first optical surface and exits the first optical element through the third optical surface to form an image on an image plane (e.g., FIG. 4E). In some embodiments, the object light from the object enters the first optical element through the first optical surface and exits the first optical element through the third optical surface to form an overlap of partial images of the object.

In some embodiments, the object light from the object is light derived from the light source (e.g., the object light is a reflection of light reflected by the object after illumination by a light source).

In some embodiments, the second optical surface is orthogonal to the third optical surface (e.g., the second optical surface 410-2 is orthogonal to the third optical surface 410-3 in FIG. 4A). In some embodiments, the third optical surface intersects the first optical surface at a first acute angle (e.g., the first acute angle 434). In some embodiments, the first optical surface intersects the second optical surface at a second acute angle (e.g., the second acute angle 432).

In some embodiments, the light transmitted through the first optical surface at the first angle with respect to the second optical surface includes object light from an object and the object light, after being directed back toward the first optical surface at the second angle, with respect to the second optical surface, by the respective optical element of the plurality of optical elements exits through a third optical surface of the first optical element (e.g., after one or more reflections off the first optical surface by total internal reflection) to form an image of the object on an image plane (or form an overlap of partial images of the object).

In some embodiments, the first optical element further includes a first reflective element disposed on the first optical surface (e.g., reflective elements 620 in FIGS. 6B-6E).

In some embodiments, the first optical surface includes regions that are not covered by any reflective element (e.g., a region between reflective elements 620-1 and 620-2 in FIG. 6E). This allows light propagated within the first optical element to exit from the first optical element through one or more regions that are not covered by any reflective element, as shown in FIG. 6E.

In some embodiments, the optical system further includes a second optical element (e.g., a complementary wedge 710 shown in FIG. 7B). The second optical element has i) a first optical surface (e.g., optical surface 710-1) that is parallel to the first optical surface of the first optical element, and ii) a second optical surface (e.g., optical surface 710-2) that is parallel to the second optical surface of the first optical element (e.g., FIG. 7B). The first optical surface of the second optical element is adjacent to the first optical surface of the first optical element and the second optical element is separated from the first optical element (e.g., the first optical surface of the second optical element is not in direct contact with the first optical surface of the first optical element).

In some embodiments, the respective optical element of the plurality of optical elements directs light having a first wavelength and transmits light having a second wavelength. The first wavelength is longer than 750 nm, and the second wavelength is shorter than 750 nm. For example, as shown in FIG. 8, optical element 412-1 transmits visible light and reflects near-infrared light.

In some embodiments, directing light includes diffracting or reflecting the light.

In some embodiments, the optical system further includes a substrate located adjacent to the second optical surface of the first optical element (e.g., substrate 416 in FIG. 6E). The plurality of optical elements is coupled with the substrate. In some embodiments, the respective optical element of the plurality of optical elements has a reflective curved surface (e.g., optical element 412-1 in FIG. 7E, such as a concave cylindrical mirror). In some embodiments, the reflective curved surface is formed by a reflective film disposed on a curved surface.

In some embodiments, the optical system further includes a substrate located adjacent to the second optical surface of the first optical element. The plurality of optical elements is coupled with the substrate. The respective optical element of the plurality of optical has a flat reflective surface (e.g., optical element 412-1 in FIG. 6E). In some embodiments, the flat reflective surface is formed by a reflective film disposed on a flat surface.

In some embodiments, the respective optical element has a spatially varying refractive index profile (e.g., a volume Bragg reflector).

In accordance with some embodiments, a method of eye-tracking includes receiving, at a first optical element having at least a first optical surface and a second optical surface that is not parallel to the first optical surface, rays from one or more portions of an eye. The method also includes receiving, at a respective optical element of a plurality of optical elements positioned adjacent to the second optical surface of the first optical element, rays transmitted through the first optical surface at a first angle with respect to the second optical surface and directing the rays back toward the first optical surface at a second angle, that is distinct from the first angle, with respect to the second optical surface. The method includes forming an image of the eye using rays that exit through a third optical surface of the first optical element; and determining a position of the eye based on the image.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical system comprising:
   a first optical element having at least a first optical surface, a second optical surface, and a third optical surface, wherein the first optical surface, the second optical surface, and the third optical surface are non-parallel to one another; and
   a plurality of optical elements positioned adjacent to the second optical surface of the first optical element, wherein:
      a respective optical element of the plurality of optical elements is configured for at least one of the following:
         receiving light transmitted through the first optical surface at a first angle with respect to the second optical surface and directing the light back to the first optical surface at a second angle, that is distinct from the first angle, with respect to the second optical surface; or
         receiving light guided through the first optical element at a third angle with respect to the second optical surface and directing the light to the first optical surface at a fourth angle, that is distinct from the third angle, with respect to the second optical surface.

2. The optical system of claim 1, wherein the respective optical element of the plurality of optical elements is selected from a group consisting of a reflector or a diffraction element.

3. The optical system of claim 1, wherein light guided through the first optical element is from a light source and enters the first optical element through a third optical surface of the first optical element, the light directed to the first optical surface at the fourth angle with respect to the second optical surface exits the first optical element through the first optical surface of the first optical element to illuminate an object.

4. The optical system of claim 3, wherein a first portion of the light exits the first optical element at a first location on the second optical surface to a respective optical element of the plurality of optical elements, and a second portion of the light exits the first optical element at a second location on the second optical surface, the first location on the second optical surface being spatially separated from the second location on the second optical surface.

5. The optical system of claim 3, wherein light received at the third optical surface is separated into a plurality of portions and respective portions of the plurality of portions are transmitted through the first optical surface of the first optical element at discrete locations to illuminate one or more portions of the object.

6. The optical system of claim 3, wherein object light from the object enters the first optical element through the first optical surface and exits the first optical element through the third optical surface to form an image on an image plane.

7. The optical system of claim 6, wherein the object light from the object is light derived from the light source.

8. The optical system of claim 3, wherein the second optical surface is orthogonal to the third optical surface, and the third optical surface intersects the first optical surface at a first acute angle.

9. The optical system of claim 8, wherein the first optical surface intersects the second optical surface at a second acute angle.

10. The optical system of claim 1, wherein the first optical element has a shape of a wedge and the third optical surface has a surface area that is smaller than both a surface area of the first optical surface and a surface area of the second optical surface.

11. The optical system of claim 1, wherein the light transmitted through the first optical surface at the first angle with respect to the second optical surface comprises object light from an object and the object light, after being directed back to the first optical surface at the second angle, with respect to the second optical surface, by the respective optical element of the plurality of optical elements, exits through a third optical surface of the first optical element to form an image of the object on an image plane.

12. The optical system of claim 1, wherein the first optical element further comprises a first reflective element disposed on the first optical surface.

13. The optical system of claim 12, wherein the first optical surface comprises regions that are not covered by any reflective element.

14. The optical system of claim 1, further comprising a second optical element, the second optical element having i) a first optical surface that is parallel to the first optical surface of the first optical element, and ii) a second optical surface that is parallel to the second optical surface of the first optical element, wherein the first optical surface of the second optical element is adjacent to the first optical surface of the first optical element and the second optical element is separated from the first optical element.

15. The optical system of claim 1, wherein the respective optical element of the plurality of optical elements directs light having a first wavelength and transmits light having a second wavelength, the first wavelength being longer than 750 nm, and the second wavelength being shorter than 750 nm.

16. The optical system of claim 15, further comprising:
a substrate located adjacent to the second optical surface of the first optical element, wherein:
the plurality of optical elements is coupled with the substrate; and
the respective optical element of the plurality of optical elements has a curved reflective surface.

17. The optical system of claim 15, further comprising:
a substrate located adjacent to the second optical surface of the first optical element, wherein:
the plurality of optical elements is coupled with the substrate; and
the respective optical element of the plurality of optical elements has a flat reflective surface.

18. The optical system of claim 1, wherein at least one of the following is satisfied:
the directing the light back to the first optical surface at the second angle includes directing back light of a first wavelength longer than 750 nm while transmitting light of a second wavelength shorter than 750 nm with a transmittance greater than 90%; or
the directing the light back to the first optical surface at the fourth angle includes directing back light of the first wavelength longer than 750 nm while transmitting light of the second wavelength shorter than 750 nm with a transmittance greater than 90%.

19. The optical system of claim 1, wherein at least one of the plurality of optical elements has a flat surface that is positioned parallel to the second optical surface of the first optical element.

20. An optical system, comprising:
a first optical element having at least a first optical surface, a second optical surface, and a third optical surface, wherein the first optical surface, the second optical surface, and the third optical surface are non-parallel to one another; and
a plurality of optical elements positioned adjacent to the second optical surface of the first optical element, wherein:
a respective optical element of the plurality of optical elements is configured for at least one of the following:
receiving light transmitted through the first optical surface at a first angle with respect to the second optical surface and directing the light back toward the first optical surface at a second angle, that is distinct from the first angle, with respect to the second optical surface; or
receiving light guided through the first optical element at a third angle with respect to the second optical surface and directing the light toward the first optical surface at a fourth angle, that is distinct from the third angle, with respect to the second optical surface; and
the respective optical element has a spatially varying refractive index profile.

* * * * *